(12) United States Patent
Nambara

(10) Patent No.: US 10,030,843 B2
(45) Date of Patent: Jul. 24, 2018

(54) ILLUMINATION LENS, ILLUMINATION UNIT, AND HEAD-UP DISPLAY DEVICE

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/111,012

(22) PCT Filed: Jan. 12, 2015

(86) PCT No.: PCT/JP2015/000093
§ 371 (c)(1),
(2) Date: Jul. 12, 2016

(87) PCT Pub. No.: WO2015/107883
PCT Pub. Date: Jul. 23, 2015

(65) Prior Publication Data
US 2016/0334075 A1    Nov. 17, 2016

(30) Foreign Application Priority Data
Jan. 15, 2014   (JP) .................................. 2014-005371

(51) Int. Cl.
*G09F 13/04* (2006.01)
*F21V 5/04* (2006.01)
(Continued)

(52) U.S. Cl.
CPC .............. *F21V 5/045* (2013.01); *B60K 35/00* (2013.01); *G02B 3/08* (2013.01); *G02B 27/0101* (2013.01);
(Continued)

(58) Field of Classification Search
CPC ......... G02F 1/133604; G02F 1/133607; G02F 1/133608
(Continued)

(56) References Cited

U.S. PATENT DOCUMENTS

| | | | |
|---|---|---|---|
| 5,479,222 A * | 12/1995 | Volk ...................... | A61B 3/125 351/159.02 |
| 2006/0109443 A1* | 5/2006 | Toyoda ................ | G02B 3/0056 355/67 |
| 2013/0335710 A1* | 12/2013 | Okamoto .................. | G02F 1/29 353/30 |

FOREIGN PATENT DOCUMENTS

| | | |
|---|---|---|
| JP | 2002-352611 A | 12/2002 |
| JP | 2005338680 A | 12/2005 |

(Continued)

*Primary Examiner* — Daniel St Cyr
(74) *Attorney, Agent, or Firm* — Harness, Dickey & Pierce, P.L.C.

(57) ABSTRACT

An illumination lens condenses a light from a light source and emits the light toward a display to illuminate the display. The illumination lens includes multiple first lens surface parts having a shape obtained by extracting multiple portions of a first virtual lens surface along a first optical axis, the first virtual lens surface defining the first optical axis on which the light source is disposed and being at least twice differentiable between optical axes arranged in a reference direction, and multiple second lens surface parts having a shape obtained by extracting multiple portions of a second virtual lens surface along a second optical axis, the second virtual lens surface defining the second optical axis and being at least once differentiable between the optical axes arranged in the reference direction. The first lens surface parts and the second lens surface parts are alternately arranged in the reference direction.

20 Claims, 17 Drawing Sheets

(51) Int. Cl.
*B60K 35/00* (2006.01)
*G02B 3/08* (2006.01)
*G02B 27/01* (2006.01)

(52) U.S. Cl.
CPC *B60K 2350/203* (2013.01); *B60K 2350/2065* (2013.01); *G02B 2027/0118* (2013.01)

(58) Field of Classification Search
USPC .................................... 362/97.1, 97.2, 97.3
See application file for complete search history.

(56) References Cited

FOREIGN PATENT DOCUMENTS

| | | |
|---|---|---|
| JP | 2008-311032 A | 12/2008 |
| JP | 2009109780 A | 5/2009 |
| JP | 2009169399 A | 7/2009 |
| JP | 2009258621 A | 11/2009 |
| JP | 2010-197919 A | 9/2010 |

\* cited by examiner

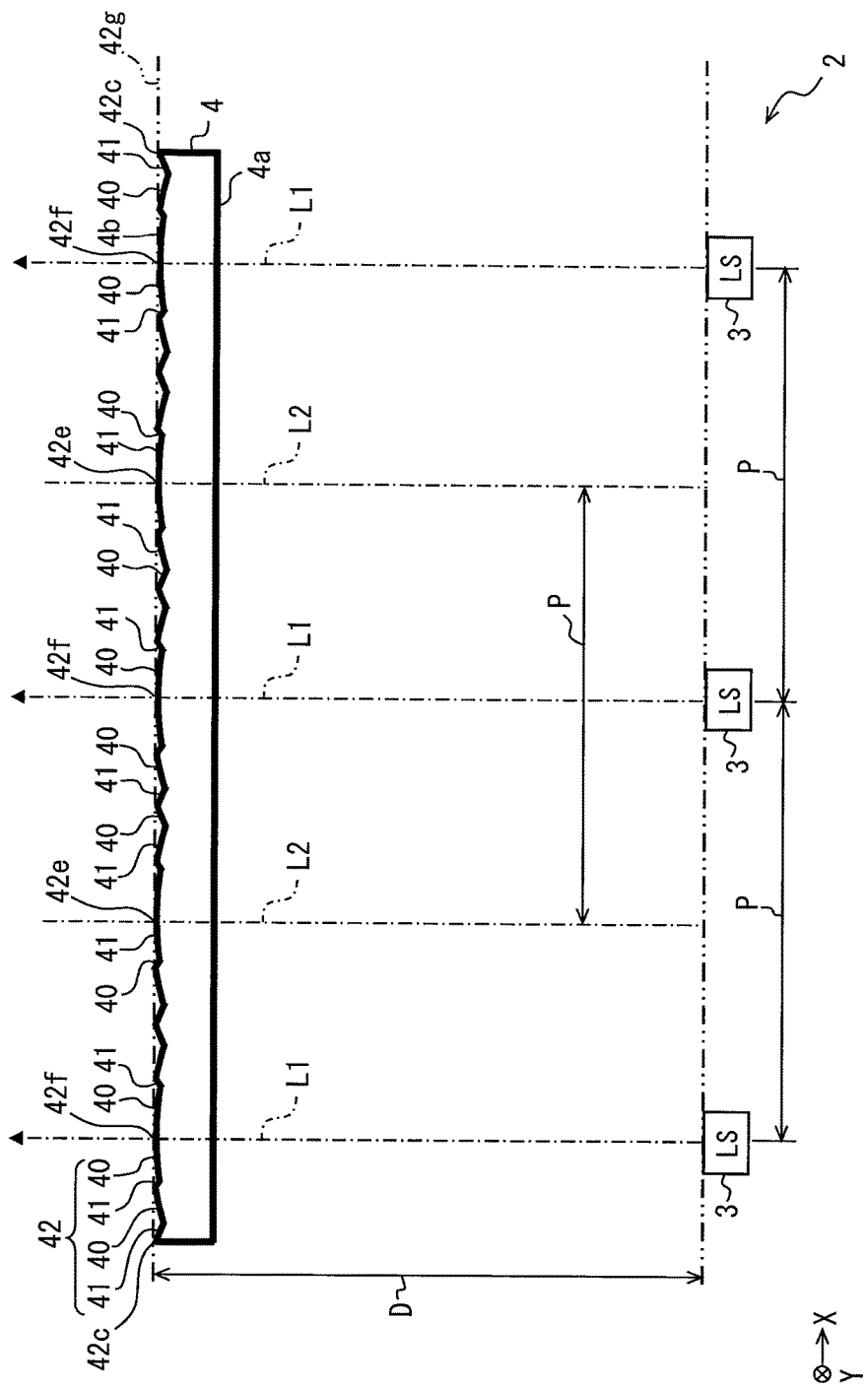

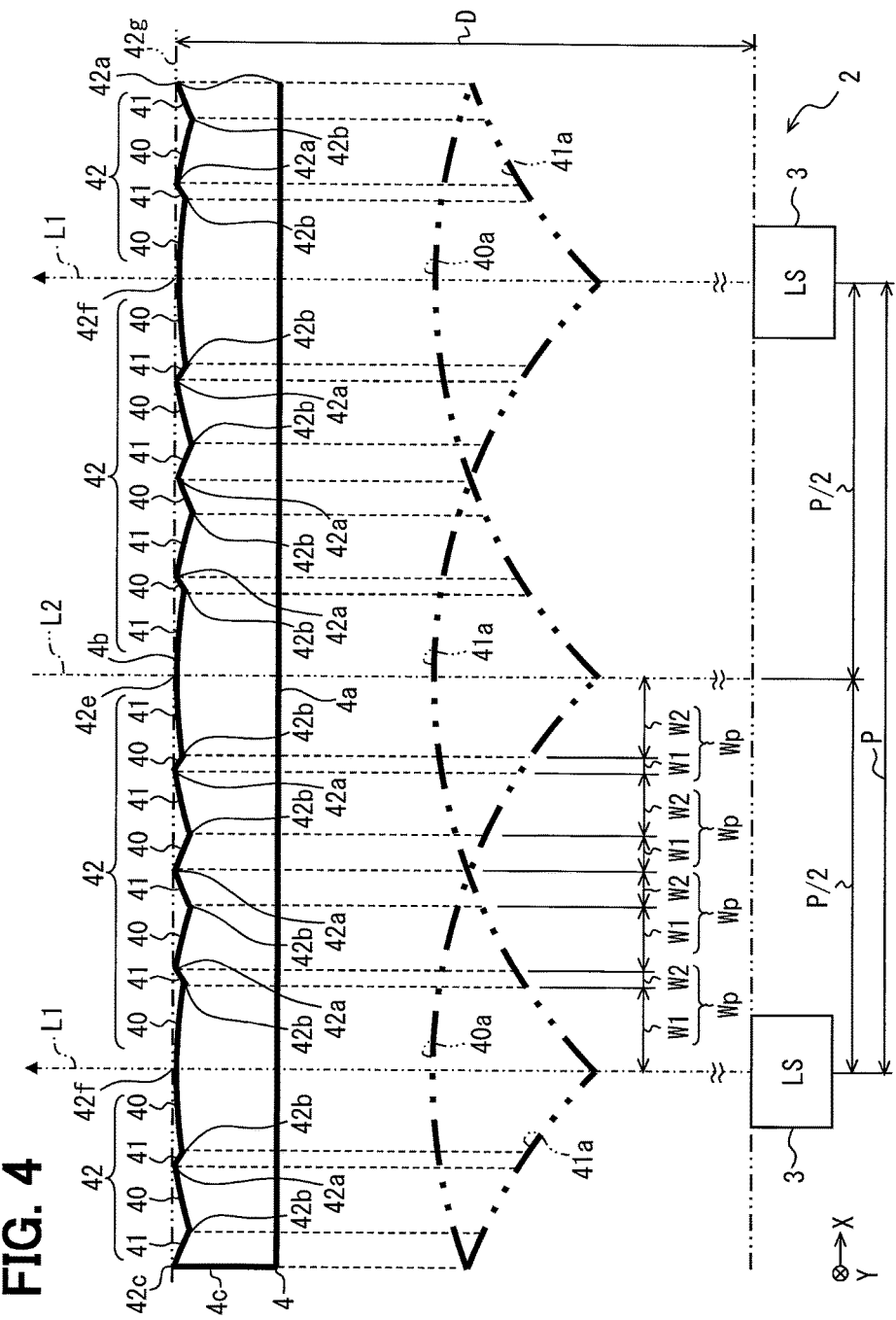

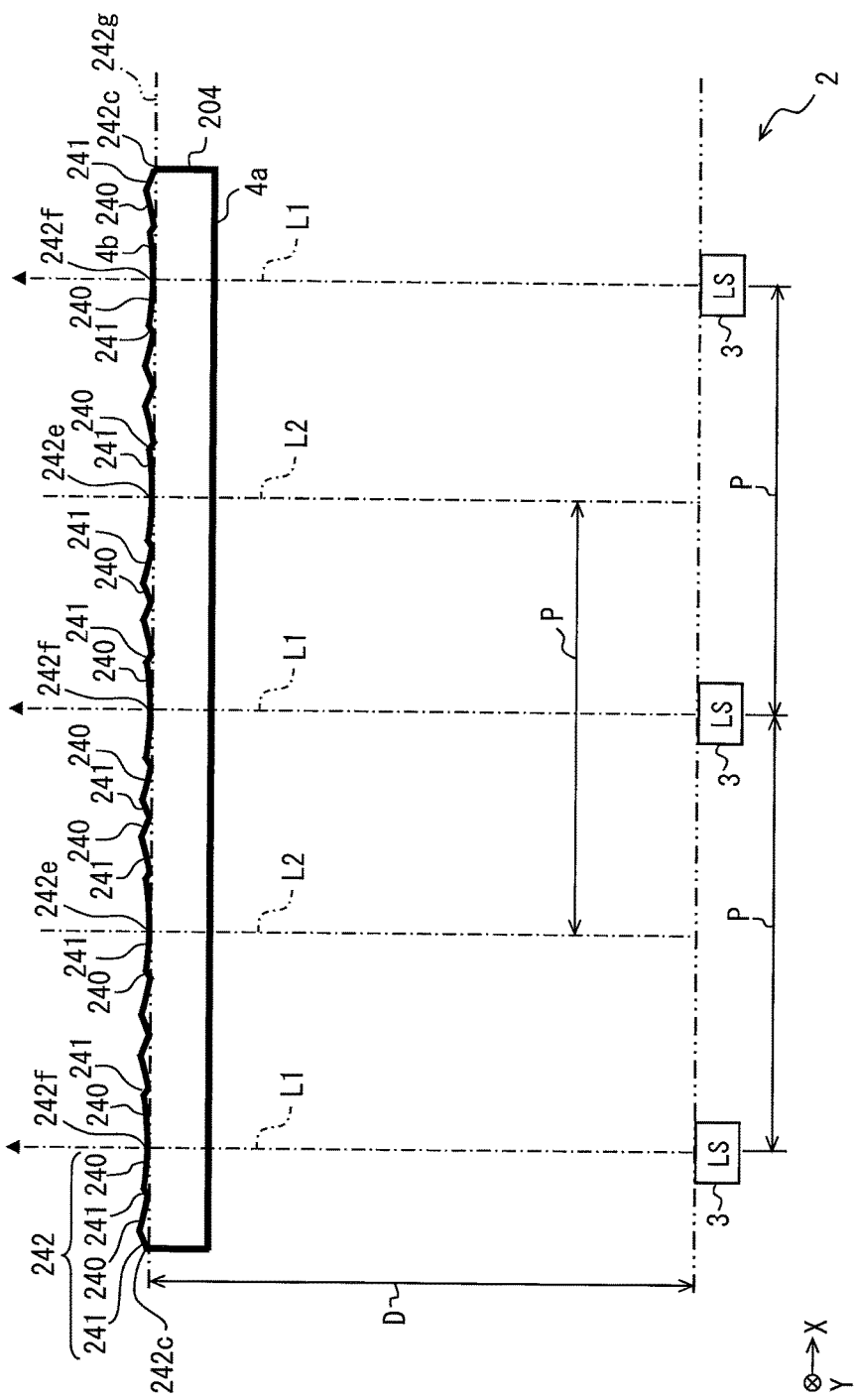

ILLUMINATION LENS, ILLUMINATION UNIT, AND HEAD-UP DISPLAY DEVICE

CROSS REFERENCE TO RELATED APPLICATIONS

This application is a U.S. National Phase Application under 35 U.S.C. 371 of International Application No. PCT/JP2015/000093 filed on Jan. 12, 2015 and published in Japanese as WO 2015/107883 A1 on Jul. 23, 2015. This application is based on and claims the benefit of priority from Japanese Patent Application No. 2014-005371 filed on Jan. 15, 2014. The entire disclosures of all of the above applications are incorporated herein by reference.

TECHNICAL FIELD

The present disclosure relates to an illumination lens, and an illumination unit and a head-up display device having the illumination lens.

BACKGROUND ART

Up to now, in an illumination unit such as a head-up display device (hereinafter referred to as "HUD device"), an illumination lens is used for condensing a light from a light source and emitting the light toward an illumination target to illuminate the illumination target.

As one type of the above lens, Patent Document 1 discloses an illumination lens having multiple second lenticular lens surfaces on each of both sides between which multiple first lenticular lens surfaces are sandwiched in a lateral direction. In the disclosure, each of the first lenticular lenses and the second lenticular lenses is shaped into a cylindrical convex lens surface that is twice differentiable in a cross section taken along the lateral direction, and has a curvature different from each other, thereby being capable of exhibiting a light condensing function along each optical axis.

In the illumination lens disclosed in Patent Document 1, the intensity of an emitted light becomes higher on the optical axis of the first lenticular lens surface whereas the intensity of the emitted light becomes lower when the emitted light is spaced apart from the optical axis. Since the above phenomenon occurs in the second lenticular lens surfaces similarly, illuminance unevenness may increase in the illumination derived from the emitted light.

PRIOR ART DOCUMENT

Patent Document

Patent Document 1: JP 2009-169399 A

SUMMARY

The present disclosure has been made in view of the above-mentioned circumstances, and an object of the present disclosure is to provide an illumination lens that suppresses illuminance unevenness in illumination derived from an emitted light, and an illumination unit and an HUD device each having the illumination lens.

According to a first aspect of the present disclosure, an illumination lens condenses a light from a light source and emits the light toward an illumination target to illuminate the target. The illumination lens includes a plurality of first lens surface parts, and a plurality of second lens surface parts. The plurality of first lens surface parts and the plurality of second lens surface parts are alternately arranged in a reference direction. Each of the plurality of first lens surface parts has a shape obtained by extracting a part of a first virtual lens surface along a first optical axis on which the light source is disposed, the first optical axis being defined by the first virtual lens surface. Each of the plurality of second lens surface parts has a shape obtained by extracting a part of a second virtual lens surface along a second optical axis, the second optical axis being defined by the second virtual lens surface and deviated in the reference direction from the first optical axis substantially in parallel. The first virtual lens surface is at least twice differentiable between the first optical axis and the second optical axis. The second virtual lens surface is at least once differentiable between the first optical axis and the second optical axis.

According to the illumination lens, each of the first lens surface parts has a shape obtained by extracting a part from the first virtual lens surface defining the first optical axis and being at least twice differentiable and can exert the light condensing function along the first optical axis on which the light source is disposed. On the other hand, each of the second lens surface parts has a shape obtained by extracting a part from the second virtual lens surface defining the second optical axis and being at least once differentiable, and the first lens surface parts and the second lens surface parts are alternately arranged in the reference direction. With the above configuration, on the second optical axis eccentrically spaced apart from the first optical axis in the reference direction, and between the first optical axis and the second optical axis, the emitted light passing through at least one second lens surface part can be superimposed on the emitted light that has passed through at least one first lens surface part. As a result, even at a position spaced apart from the first optical axis where the light source is disposed, the intensity of the emitted light can be increased, and the illuminance unevenness in the illumination of the illumination target can be suppressed.

According to a second aspect of the present disclosure, an illumination unit includes a light source that emits a light, and an illumination lens that condenses the light from the light source and emits the light toward an illumination target to illuminate the illumination target. The illumination lens includes a plurality of first lens surface parts and a plurality of second lens surface parts. The plurality of first lens surface parts and the plurality of second lens surface parts are alternately arranged in a reference direction. Each of the plurality of first lens surface parts has a shape obtained by extracting a part of a first virtual lens surface along a first optical axis on which the light source is disposed, the first optical axis being defined by the first virtual lens surface. Each of the plurality of second lens surface parts has a shape obtained by extracting a part of a second virtual lens surface along a second optical axis, the second optical axis being defined by the second virtual lens surface and deviated in the reference direction from the first optical axis substantially in parallel. The first virtual lens surface is at least twice differentiable between the first optical axis and the second optical axis. The second virtual lens surface is at least once differentiable between the first optical axis and the second optical axis.

According to the illumination unit, the illuminance unevenness in the illumination of the illumination target can be suppressed due to the emitted light from the same illumination lens as the illumination lens described above.

According to a third aspect of the present disclosure, a head-up display device projects an image onto a display member of a moving object to visibly display a virtual image of the image from an interior of the moving object. The head-up display device includes a display that displays the image, a light source that emits a light, and an illumination lens that condenses the light from the light source and emits the light toward the display to illuminate the display. The illumination lens includes a plurality of first lens surface parts and a plurality of second lens surface parts. The plurality of first lens surface parts and the plurality of second lens surface parts are alternately arranged in a reference direction. Each of the plurality of first lens surface parts has a shape obtained by extracting a part of a first virtual lens surface along a first optical axis on which the light source is disposed, the first optical axis being defined by the first virtual lens surface. Each of the plurality of second lens surface parts has a shape obtained by extracting a part of a second virtual lens surface along a second optical axis, the second optical axis being defined by the second virtual lens surface and deviated in the reference direction from the first optical axis substantially in parallel. The first virtual lens surface is at least twice differentiable between the first optical axis and the second optical axis. The second virtual lens surface is at least once differentiable between the first optical axis and the second optical axis.

According to the HUD device, the illuminance unevenness in the illumination of the display can be suppressed due to the emitted light from the same illumination lens as the illumination lens described above. Hence, the intensity unevenness felt by a viewer can be suppressed in the virtual image displayed by projecting the display image of the display onto the display member of the moving object.

BRIEF DESCRIPTION OF THE DRAWINGS

FIG. 3 is a side view illustrating the illumination lens according to the first embodiment.

FIG. 4 is a schematic view illustrating the illumination lens according to the first embodiment.

FIG. 6 is a side view illustrating an illumination lens according to a second embodiment of the present disclosure.

DESCRIPTION OF EMBODIMENTS

Figure 1:
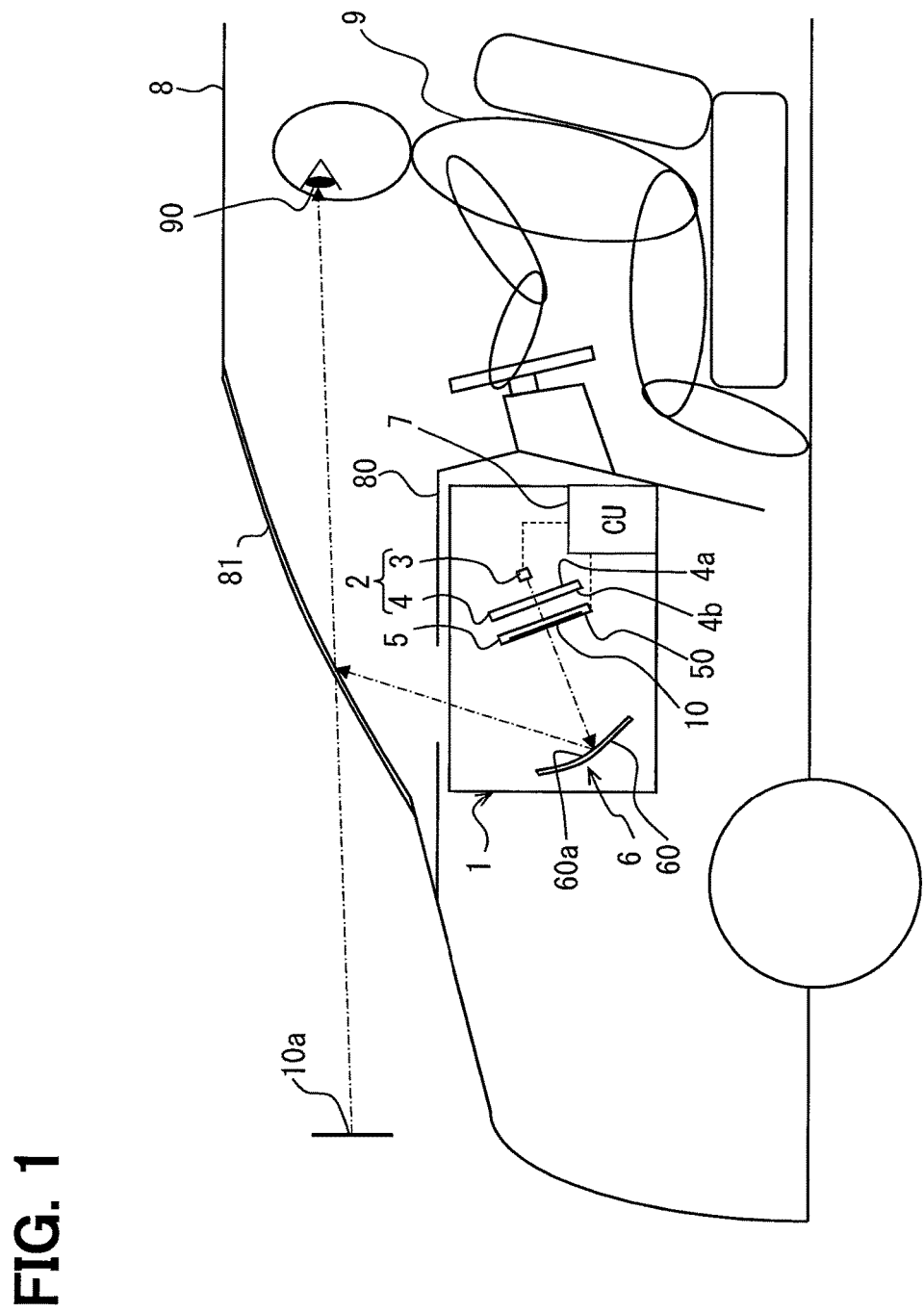
FIG. 1 is a schematic view illustrating a state in which an HUD device is mounted in a vehicle according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

As illustrated in FIG. 1, an HUD device (head-up display device) 1 according to a first embodiment of the present disclosure is mounted in a vehicle 8 serving as an example of a "moving object", and is accommodated inside of an instrument panel 80. The HUD device 1 projects a display image 10 on a windshield 81 serving as an example of a "display member" of the vehicle 8. As a result, in the interior of the vehicle 8, a light beam of the display image 10 reflected by the windshield 81 reaches eye points 90 of a viewer 9. The viewer 9 perceives the arrival light beam to the eye points 90 to visually recognize a virtual image 10a of the display image 10 focused anterior to the windshield 81.

The HUD device 1 includes an illumination unit 2, a display 5, an optical system 6, and a display control unit 7 (CU). The illumination unit 2 is configured by the combination of light sources 3 (LS) and an illumination lens 4.

The multiple light sources 3 are configured by point-like light emitting sources such as light emitting diodes (LEDs) Each of the light sources 3 is energized to emit a light, and projects the emitted light toward the illumination lens 4. Each of the light sources 3 according to the present embodiment projects a white light toward the illumination lens 4 for the purpose of illuminating the display 5 to be described in detail later.

The illumination lens 4 is made of a light-transmissive material such as resin or glass, and formed into a rectangular plate shape as a whole. One plate surface of the illumination lens 4 configures an incident surface 4a facing the respective light sources 3. Lights projected from the respective light sources 3 are incident on the incident surface 4a. The other plate surface of the illumination lens 4 configures an emitting surface 4b facing the display 5 serving as an example of an "illumination target". The light entering the incident surface 4a from the respective light sources 3 is emitted from the emitting surface 4b. In this example, the illumination lens 4 has a light condensing function for condensing the light from the respective light sources 3, and emits the light collected by the function toward the display 5 side serving as an example of the "illumination target".

The display 5 is configured by an image display panel such as a dot matrix TFT liquid crystal panel, and has a rectangular screen 50 corresponding to the illumination lens 4. The display 5 forms a monochromatic image or a color image as the display image 10 on the screen 50 by driving multiple pixels configuring the screen 50. The display 5 is transmissively illuminated by the light received from the respective light sources 3 through the illumination lens 4. As a result, display 5 luminescently displays the display image 10 on the screen 50. Meanwhile, the display image 10 is luminescently displayed as an optical image for displaying vehicle-related information such as a traveling speed and a traveling direction of the vehicle 8, or warning.

In the present embodiment, the optical system 6 mainly includes one concave mirror 60. The concave mirror 60 has a reflecting surface 60a formed by depositing a metal reflection film made of aluminum on a base material made of resin or glass. The concave mirror 60 has a reflection function for reflecting the light input from the screen 50 of the display 5 by the reflecting surface 60a, and guides the light reflected by the aid of the function to the windshield 81 side. The display image 10 on the screen 50 is enlarged and projected on the windshield 81 due to the light guiding with the result that the virtual image 10a of the display image 10 is displayed so as to be visible from the viewer 9 in the interior of the vehicle 8. Meanwhile, the optical system 6 may have multiple concave mirrors 60 or may have a reflection mirror or a lens other than the concave mirror 60.

The display control unit 7 is configured by an electronic circuit such as a microcomputer, and electrically connected with the respective light sources 3 and the display 5. Further, the display control unit 7 is communicatively connected to another control unit and various sensors in the vehicle 8. The display control unit 7 controls the energization of the respective light sources 3 according to the vehicle-related information to emit the light from those light sources 3. At the same time, the display control unit 7 controls the driving of pixels configuring the screen 50 according to the vehicle-related information to realize the display of the display image 10 on the screen 50, and further the display of the virtual image 10a for the viewer 9.

Next, a detailed configuration of the illumination unit 2 will be described. A reference direction X shown in FIGS. 2 and 3 indicates a longitudinal direction of the illumination lens 4 corresponding to the longitudinal direction of the screen 50. An orthogonal direction Y shown in FIGS. 2 and 3 indicates a lateral direction of the illumination lens 4 corresponding to a lateral direction of the screen 50.

Figure 2:
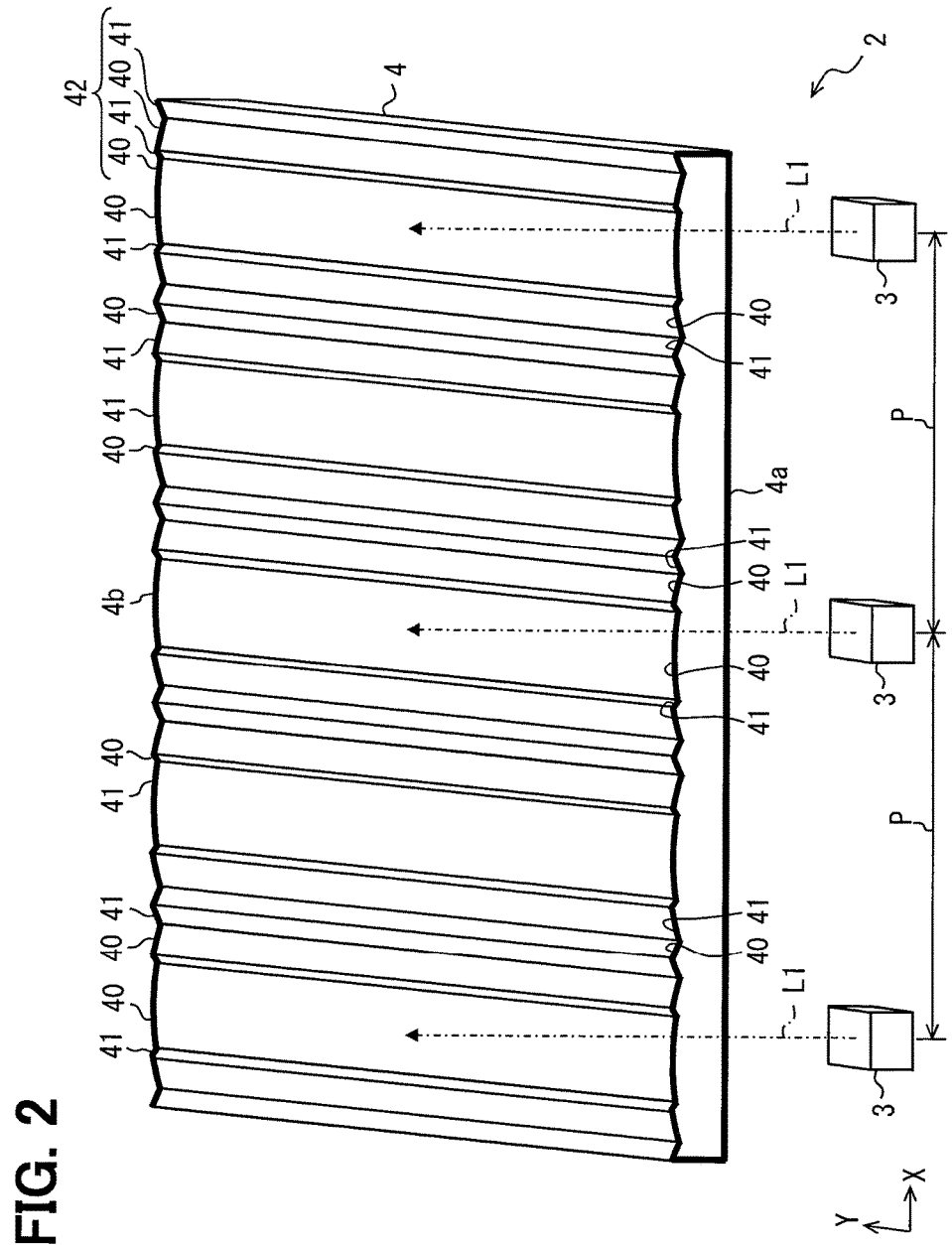
FIG. 2 is a perspective view illustrating an illumination lens according to the first embodiment.

As illustrated in FIGS. 2 and 3, the multiple (in the present embodiment, three) light sources 3 in the illumination unit 2 are arranged linearly along the reference direction X. Pitches P between the respective light sources 3 arranged apart from each other in the reference direction X are set to a fixed value between any light sources 3.

The illumination lens 4 of the illumination unit 2 is a novel complex Fresnel lens including the planar incident surface 4a and the emitting surface 4b having multiple first lens surface parts 40 and multiple second lens surface parts 41. As illustrated in FIG. 4, each of the first lens surface part 40 has a shape obtained by extracting a portion of one of multiple first virtual lens surfaces 40a virtually defined, the number of which is the same as the number of the light sources 3. Each of the second lens surface parts 41 has a shape obtained by extracting a portion of one of multiple second virtual lens surfaces 41a virtually defined, the number of which is larger than the number of the light sources 3 by one. FIG. 4 representatively illustrates two of the three first virtual lens surfaces 40a, and also representatively illustrates three of the four second virtual lens surfaces 41a.

Specifically, the respective first virtual lens surfaces 40a are virtually defined to determine the respective individual first optical axes L1 at multiple portions corresponding to the light sources 3 different from each other. With this definition, the respective light sources 3 are disposed on the first optical axes L1 extending in parallel at equal pitches P in the reference direction X. The respective first virtual lens surfaces 40a in the present embodiment each have a predetermined curvature in the reference direction X so as to be defined to have a cylindrical convex lens surface shape that is at least once differentiable and twice differentiable between the first optical axis L1 and the second optical axis L2 which are arranged substantially in parallel to each other in a cross-section along the reference direction X. In this example, the respective first virtual lens surfaces 40a may be at most twice differentiable, or may be three or more times differentiable. Each of the first virtual lens surfaces 40a has an axisymmetric profile with respect to a symmetric axis that is the corresponding first optical axis L1 in a cross-section along the reference direction X. The multiple first virtual lens surfaces 40a have the same profile as each other.

On the other hand, the respective second virtual lens surfaces 41a are virtually defined to determine the individual second optical axis L2 between the two adjacent first optical axes L1. As a result, the multiple second optical axes L2 extend in parallel at pitches P in the reference direction X, and the respective second optical axes L2 are spaced apart from the two adjacent first optical axes L1 in the reference direction X by half pitches P/2. In other words, the respective second optical axes L2 are eccentric from the two adjacent first optical axes L1 in the reference direction X to a center position between those optical axes L1. The respective second virtual lens surfaces 41a in the present embodiment each have a predetermined curvature in the reference direction X so as to be defined to have a cylindrical convex lens surface shape that is at least once differentiable and twice differentiable between the optical axes L1 and L2 which are arranged substantially in parallel to each other in a cross-section along the reference direction X. In this example, the respective second virtual lens surfaces 41a may be at most twice differentiable, or may be three or more times differentiable. Each of the second virtual lens surfaces 41a has an axisymmetric profile with respect to a symmetric axis that is the corresponding second optical axis L2 in the cross-section along the reference direction X. The multiple second virtual lens surfaces 41a have the same profile as each other and as that of the first virtual lens surfaces 40a.

A set number of first lens surface parts 40 are extracted from each first virtual lens surfaces 40a along the first optical axes L1 as indicated by dashed lines in FIG. 4. A set number of second lens surface parts 41 are extracted from each second virtual lens surfaces 41a along the second optical axes L2 as indicated by dashed lines in FIG. 4. As a result, the first lens surface parts 40 and the second lens surface parts 41 are alternately arranged in the reference direction X between the first optical axis L1 and the second optical axis L2 arranged in the reference direction X (also refer to FIGS. 2 and 3) to configure an alternating array structure 42. In this example, as described above, the multiple first virtual lens surfaces 40a and the multiple second virtual lens surfaces 41a are defined on the profile of the common emitting surface 4b. As a result, multiple alternating array structures 42 are provided on the emitting surface 4b so as to be axisymmetric with respect to the symmetric axis that is each second optical axis L2 or each first optical axis L1.

As illustrated in FIG. 4, in each of the alternating array structures 42, each of the first lens surface parts 40 comes in contact with the second lens surface part 41 located on one side of the first lens surface part 40 to form a sharp convex boundary part 42a. Each of the first lens surface parts 40 comes in contact with the second lens surface part 41 located on an opposite side to the convex boundary part 42a to form a V-grooved concave boundary part 42b. The convex boundary part 42a and the concave boundary part 42b between which the first lens surface part 40 is provided are positionally displaced from each other in the reference direction X. Widths W1 of the respective first lens surface parts 40 in the reference direction X are increased more as the first lens surface parts 40 are closer to the corresponding first optical axis L1. In other words, the widths W1 of the first lens surface parts 40 are gradually increased toward the corresponding first optical axis L1.

In each of the alternating array structures 42, each of the second lens surface parts 41 comes in contact with the first lens surface part 40 located on one side of the second lens surface part 41 to form the concave boundary part 42b. Each of the second lens surface parts 41 comes in contact with the first lens surface part 40 located on an opposite side to the concave boundary part 42b to form the convex boundary part 42a. The concave boundary part 42b and the convex boundary part 42a between which the second lens surface parts 41 is provided are positionally displaced from each other in the reference direction X. In each of the second lens surface parts 41 of the respective alternating array structures 42 disposed on both edges of the illumination lens 4, the concave boundary part 42b on one side of the second lens surface part 41 and a corner 42c forming an end surface part 4c of the illumination lens 4 on the opposite side are positionally displaced from each other in the reference direction X. Widths W2 of the respective second lens surface parts 41 in the reference direction X are increased more as the second lens surface parts 41 are closer to the corresponding second optical axis L2. In other words, the widths W2 of the second lens surface parts 41 are gradually increased toward the corresponding second optical axis L2.

In each of the alternating array structures 42, the number of first lens surface parts 40 extracted from the first virtual lens surface 40a is set to be the same (four or two in the present embodiment) as the number of second lens surface parts 41 extracted from the second virtual lens surface 41a. With this configuration, the first lens surface part 40 and the second lens surface part 41 which are adjacent to each other configure a pair of lens surface parts, and multiple pairs (four pairs or two pairs in the present embodiment) of lens surface parts are arranged in the reference direction X for each of the alternating array structures 42. A width Wp of each pair of lens surface parts in the reference direction X is set to a predetermined width matching an interval (W1+W2) between the respective convex boundary parts 42a.

As illustrated in FIGS. 3 and 4, with respect to the first optical axis L1 used as the symmetric axis located between the adjacent alternating array structures 42, the respective first lens surface parts 40 of those alternating array structures 42 are axisymmetrically adjacent to each other to provide a convex boundary part 42f having a smooth curved surface. In addition, with respect to the second optical axis L2 used as the symmetric axis located between the adjacent alternating array structures 42, the respective second lens surface parts 41 of those alternating array structures 42 are axisymmetrically adjacent to each other to provide a convex boundary part 42e having a smooth curved surface. In this example, all of the convex boundary parts 42f and 42e are disposed on a virtual plane 42g orthogonal to the first and second optical axes L1 and L2 together with all of the convex boundary parts 42a and the corners 42c. With the above configuration, in the first embodiment, distances D from the virtual plane 42g to the respective light sources 3, in other words, the distances D from the respective convex boundary parts 42f to the light source 3 on the same first optical axis L1 are set to be shorter than a focal length specific to the first virtual lens surfaces 40a. Meanwhile, the distances D may be set to be equal to or longer than the focal length specific to the first virtual lens surfaces 40a.

A light condensing principle of the illumination unit 2 configured as described above will be described with reference to conceptual schematic diagrams illustrated in FIGS. 5A to 5C.

Figure 5A:
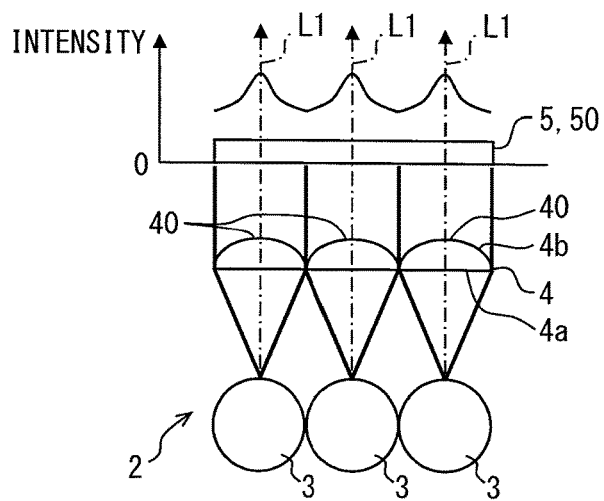
FIG. 5A is a schematic view illustrating an intensity distribution of an emitted light from first lens surface parts of the illumination lens according to the first embodiment.

As illustrated in FIG. 5A, each of the first lens surface parts 40 refracts the light input to the incident surface 4a side from the light source 3 on the corresponding first optical axis L1 on the emitting surface 4b side. With this configuration, the light emitted from each of the first lens surface parts 40 is condensed along the corresponding first optical axis L1. As a result, as illustrated in a graph of FIG. 5A, an intensity distribution that becomes maximum in the corresponding first optical axis L1 occurs in the emitted light that is emitted from each first lens surface part 40 and illuminates the screen 50 of the display 5.

Figure 5B:
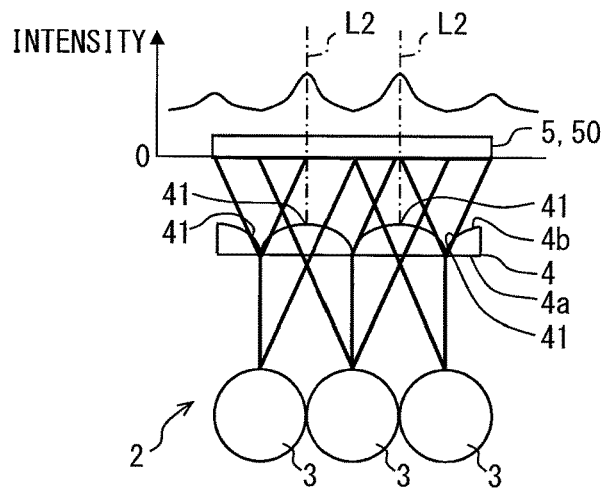
FIG. 5B is a schematic view illustrating an intensity distribution of an emitted light from second lens surface parts of the illumination lens according to the first embodiment.
Figure 5C:
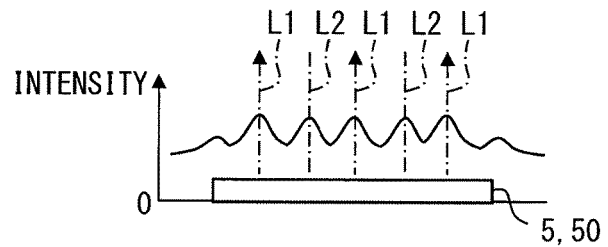
FIG. 5C is a schematic view illustrating an intensity distribution of the emitted light from the illumination lens according to the first embodiment.

On the other hand, as illustrated in FIG. 5B, each of the second lens surface parts 41 refracts the light input to the incident surface 4a side from the light source 3 on the corresponding second optical axis L2 on the emitting surface 4b side. With this configuration, the light that is emitted from each of the second lens surface parts 41 and illuminates the screen 50 of the display 5 is condensed along the corresponding second optical axis L2. As a result, as illustrated in a graph of FIG. 5B, an intensity distribution that becomes maximum in the corresponding second optical axis L2 occurs in the emitted light from each of the second lens surface parts 41.

In this example, according to the illumination lens 4 in which the first lens surface parts 40 and the second lens surface parts 41 are alternately arranged with each other between the first and second optical axes L1 and L2 which are eccentric to each other, the distribution of FIG. 5A and the distribution of FIG. 5B overlap with each other in the intensity distribution of the emitted light. In other words, in the intensity distribution overlapped as illustrated in FIG. 5C, the intensity of the emitted light is increased not only on the second optical axes L2 but also between the first and second optical axes L1 and L2. As a result, the intensity on the second optical axes L2 spaced apart from the first optical axes L1 as well as the intensity between those optical axes L1 and L2 is small in a deviation from the intensity on the first optical axes L1. Hence, in the display 5 illuminated by the emitted light from the illumination lens 4 thus configured, the illuminance unevenness in the screen 50 can be suppressed.

The operational advantages of the first embodiment described above will be described below.

According to the illumination lens 4 of the first embodiment, the respective first lens surface parts 40 have shapes obtained by extracting respective parts from the first virtual lens surface 40a that is used as the virtual lens surface defining the first optical axis L1 and is at least twice differentiable, and the first lens surface parts 40 can exert the light condensing function along the first optical axis L1 on which the light source 3 is disposed. On the other hand, the respective second lens surface parts 41 have shapes obtained by extracting respective parts from the second virtual lens surface 41a that is used as the virtual lens surface defining the first optical axis L2 and is at least twice differentiable, and the second lens surface parts 41 and the first lens surface parts 40 are alternately arranged in the reference direction X. With the above configuration, on the second optical axis L2 eccentrically spaced apart from the first optical axis L1 in the reference direction X, and between those optical axes L1 and L2, the emitted light passing through at least one second lens surface part 41 can be superimposed on the emitted light that has passed through at least one first lens surface part 40. Hence, according to the illumination unit 2 having the illumination lens 4, even at a position spaced apart from the first optical axis L1 on which the light source 3 is disposed, the intensity of the emitted light is increased, and the illuminance unevenness in the illumination of the display 5 can be suppressed. Hence, in the virtual image displayed by projecting the display image 10 of the display 5 onto the windshield 81 of the vehicle 8, the intensity unevenness felt by the viewer 9 can be also suppressed.

According to each of the second lens surface parts 41 in which the boundary parts 42a and 42b between the second lens surface part 41 and the respective first lens surface parts 40 adjacent to one side and the other side of the second lens surface part 41 are displaced in the reference direction X, the light from the light source 3 on the first optical axis L1 can be surely emitted onto the second optical axis L2 eccentric to the first optical axis L1 or between those optical axes L1 and L2. According to the above configuration, the superimposed action of the respective emitted lights passing through the first and second lens surface parts 40 and 41 is ensured, and the reliability of the effect of suppressing the illuminance unevenness can be improved.

In addition, since the widths of the respective first lens surface parts 40 are increased more in the reference direction X as the first lens surface parts 40 are closer to the first optical axis L1, the amount of light can be increased more in the emitted light in the periphery of the first optical axis L1 between the first and second optical axes L1 and L2. At the same time, since the widths of the respective second lens surface parts 41 are increased more in the reference direction X as the second lens surface parts 41 are closer to the second optical axis L2, the amount of light can be increased more in the emitted light in the periphery of the second optical axis L2 between the first and second optical axes L1 and L2. According to the above configurations, in the superimposed light of the respective emitted lights passing through the first and second lens surface parts 40 and 41, an intensity variation between the first and second optical axes L1 and L2 is reduced, and the effect of suppressing the illuminance unevenness can be enhanced.

The pair of lens surface parts having the first and second lens surface parts 40 and 41 adjacent to each other has a predetermined width Wp in the reference direction X where the multiple pairs of lens surface parts are aligned, as a result of which a difference in the amount of light from each light source 3 toward each pair of lens surface parts can be reduced. According to the above configuration, in the emitted lights passing through the respective first and second lens surface parts 40 and 41 configuring each pair of lens surface parts, since the amount of light can be ensured and superimposed on each other, the effect of suppressing the illuminance unevenness can be enhanced.

In addition, the alternating array structures 42 of the first and second lens surface parts 40 and 41 in the reference direction X are provided in the emitting surface 4b of the illumination lens 4 which emits the incident light from the light sources 3. As a result, the illuminance unevenness caused by an aberration of the emitted light from the emitting surface 4b can be also suppressed.

In addition, since the light from the multiple light sources 3 arranged along the reference direction X is condensed and emitted by the illumination lens 4, a large area of the display 5 can be illuminated while the distance between each of the light sources 3 and the illumination lens 4 is reduced. Further, since a set number of the first lens surface parts 40 are extracted from each of the multiple first virtual lens surfaces 40a that individually determines the first optical axes L1 at portions corresponding to the respective light sources 3, the light condensing function along each of the first optical axes L1 can be exerted by those first lens surface parts 40. Moreover, a set number of the second lens surface parts 41 are extracted from the multiple second virtual lens surfaces 41a that individually determines the second optical axis L2 between the first optical axes L1, and the second lens surface parts 41 form the alternating array structures 42 in cooperation with the first lens surface parts 40. Hence, according to those respective second lens surface parts 41, the superimposed action of the respective emitted lights passing through the first and second lens surface parts 40 and 41 can be exerted on each second optical axis L2 spaced apart from any first optical axis L1 and between those first and second optical axes L1 and L2. According to the above configuration, in the configuration where the portions extending from the respective light sources 3 to the illumination lens 4 are downsized, the illuminance unevenness can be suppressed.

When a set number of the second lens surface parts 41 are extracted from each of the second virtual lens surfaces 41a of the axisymmetric profile with respect to the individual second optical axes L2 as the symmetric axes, the intensity difference in the superimposed light of the respective emitted lights passing through the first and second lens surface parts 40 and 41 can be reduced on both sides of those second optical axes L2. Hence, the effect of suppressing the illuminance unevenness can be enhanced.

When the respective first lens surface parts 40 are axisymmetrically adjacent to each other with respect to each first optical axis L1 as the symmetric axis, the intensity difference of the superimposed light of the respective emitted lights passing through the first and second lens surface parts 40 and 41 can be reduced in the periphery of both sides of the optical axis L1. Hence, the effect of suppressing the illuminance unevenness can be enhanced.

When the respective second lens surface parts 41 are axisymmetrically adjacent to each other with respect to each second optical axis L2 as the symmetric axis, the intensity difference of the superimposed light of the respective emitted lights passing through the first and second lens surface parts 40 and 41 can be reduced in the periphery of both sides of the optical axis L2. Hence, the effect of suppressing the illuminance unevenness can be enhanced.

The respective first lens surface parts 40 have shapes obtained by extracting respective parts from the first virtual lens surface 40a that has the convex lens surface shape with a curvature in the reference direction X to be twice differentiable, and the first lens surface parts 40 can exert the light condensing function along the first optical axis L1 on which each light source 3 is disposed. On the other hand, the respective second lens surface parts 41 have shapes obtained by extracting respective parts from the second virtual lens surface 41a that has the convex lens surface shape with a curvature in the reference direction X to be twice differentiable, and the second lens surface parts 41 can exert the light condensing function along the second optical axis L2 eccentric from the first optical axis L1. Moreover, according to the alternating array structures 42 of the first and second lens surface parts 40 and 41 that exert the above particular light condensing functions, the superimposed action of the respective emitted lights passing through the first and second lens surface parts 40 and 41 can be ensured on the second optical axes L2 eccentrically spaced apart from the first optical axes L1 and between those first and second optical axes L1 and L2. Hence, the reliability of the effect of suppressing the illuminance unevenness can be enhanced.

In addition, the respective first lens surface parts 40 and the respective second lens surface parts 41 have shapes obtained by extracting the respective portions, respectively, from the first virtual lens surface 40a and the second virtual lens surface 41a having the same profile, thereby forming the alternating array structures 42. In the configuration described above, the light condensing function along the first optical axis L1 by the respective first lens surface parts 40 and the light condensing function along the second optical axis L2 by the respective second lens surface parts 41 can be exerted to the same degree as each other. According to the above configuration, in the superimposed light of the respective emitted lights passing through the first and second lens surface parts 40 and 41, an intensity variation between the first and second optical axes L1 and L2 is reduced, and the effect of suppressing the illuminance unevenness can be enhanced.

(Second Embodiment)

Figure 7:
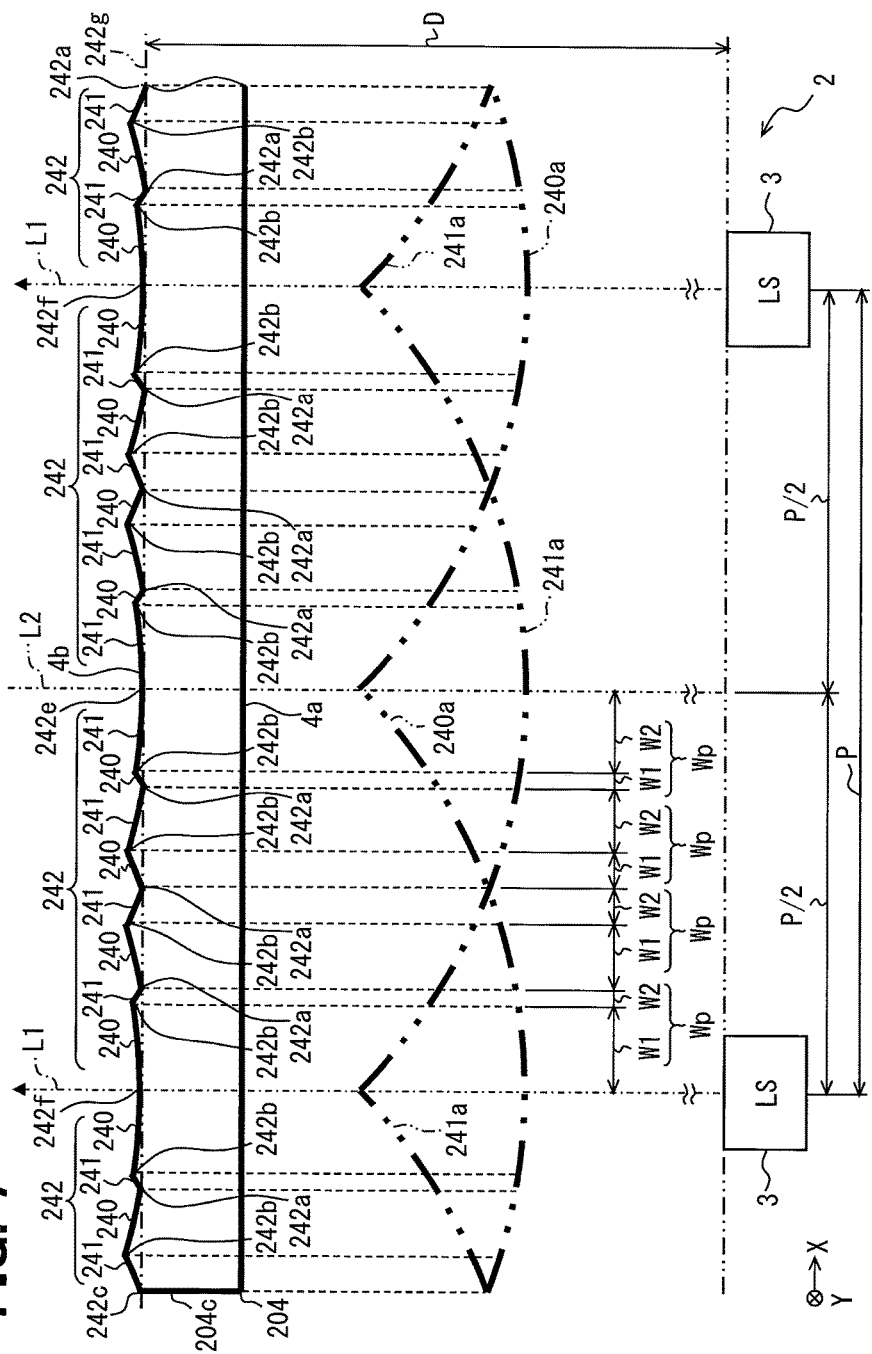
FIG. 7 is a schematic view illustrating the illumination lens according to the second embodiment.

As illustrated in FIGS. 6 and 7, a second embodiment of the present disclosure is a modification of the first embodiment.

Respective first virtual lens surfaces 240a of an illumination lens 204 according to the second embodiment have a predetermined curvature in a reference direction X so as to be defined to have a cylindrical concave lens surface shape that is at least once differentiable and twice differentiable between a first optical axis L1 and a second optical axis L2 in a cross-section along the reference direction X. In this example, the respective first virtual lens surfaces 240a may be at most twice differentiable, or may be three or more times differentiable. Each of the first virtual lens surfaces 240a has an axisymmetric profile with respect to the corresponding first optical axis L1 as a symmetric axis in a cross-section along the reference direction X. The multiple first virtual lens surfaces 240a have the same profile as each other.

The respective virtual lens surfaces 241a of the illumination lens 204 according to the second embodiment have the predetermined curvature in the reference direction X so as to be defined to have the cylindrical concave lens surface shape that is at least once differentiable and twice differentiable between the first optical axis L1 and the second optical axis L2 in the cross-section along the reference direction X. In this example, respective second virtual lens surfaces 241a may be at most twice differentiable, or may be three or more times differentiable. Each of the second virtual lens surfaces 241a has an axisymmetric profile with respect to the corresponding second optical axis L2 as a symmetric axis in the cross-section along the reference direction X. The multiple second virtual lens surfaces 241a have the same profile as each other and as that of the first virtual lens surfaces 240a.

A set number of first lens surface parts 240 are extracted from the respective first virtual lens surfaces 240a along the first optical axes L1 as indicated by dashed lines in FIG. 7. A set number of second lens surface parts 241 are extracted from the respective second virtual lens surfaces 241a along the second optical axes L2 as indicated by dashed lines in FIG. 7. As a result, the first lens surface parts 240 and the second lens surface parts 241 are alternately arranged in the reference direction X between the first optical axes L1 and the second optical axes L2 arranged in the reference direction X to configure alternating array structures 242 between those first and second optical axes L1 and L2 (also refer to FIG. 6). The multiple alternating array structures 242 are provided on an emitting surface 4b so as to be axisymmetric with respect to the respective second optical axes L2 or the respective first optical axes L1 as the symmetric axes.

As illustrated in FIG. 7, in each of the alternating array structures 242, each of the first lens surface parts 240 comes in contact with the second lens surface part 241 located on one side of the first lens surface part 240 to form a V-grooved concave boundary part 242a. Each of the first lens surface parts 240 comes in contact with the second lens surface part 241 located on an opposite side to the concave boundary part 242a to form a sharp convex boundary part 242b. The concave boundary part 242a and the convex boundary part 242b between which the first lens surface part 240 is provided are positionally displaced from each other in the reference direction X. In the reference direction X of the second embodiment, widths W1 of the respective first lens surface parts 240 are increased more as the first lens surface parts 240 are closer to the corresponding first optical axis L1. In other words, the widths W1 of the first lens surface parts 240 are gradually increased toward the corresponding first optical axis L1.

In each of the alternating array structures 242, each of the second lens surface parts 241 comes in contact with the first lens surface part 240 located on one side of the second lens surface part 241 to form the convex boundary part 242b. Each of the second lens surface parts 241 comes in contact with the first lens surface part 240 located on an opposite side to the concave boundary part 242b to form the concave boundary part 242a. The convex boundary part 242b and the concave boundary part 242a between which the second lens surface part 241 is provided are positionally displaced from each other in the reference direction X. In each of the second lens surface parts 241 of the respective alternating array structures 242 disposed on both edges of the illumination lens 204, the convex boundary part 242b on one side of the second lens surface part 241 and a corner 242c forming an end surface part 204c of the illumination lens 204 on the opposite side are positionally displaced from each other in the reference direction X. In the reference direction X of the second embodiment, widths W2 of the respective second lens surface parts 241 are increased more as the second lens surface parts 241 are closer to the corresponding second optical axis L2. In other words, the widths W2 of the second lens surface parts 241 are gradually increased toward the corresponding second optical axis L2.

With the same principle as that in the first embodiment, the first lens surface part 240 and the second lens surface part 241 which are adjacent to each other configure a pair of lens surface parts, and multiple pairs (four pairs or two pairs in the present embodiment) of lens surface parts are arranged in the reference direction X for each of the alternating array structures 242. A width Wp of each pair of lens surface parts in the reference direction X is set to a predetermined width matching an interval (W1+W2) between the respective concave boundary parts 242a.

As illustrated in FIGS. 6 and 7, with respect to the first optical axis L1 used as the symmetric axis located between the adjacent alternating array structures 242, the respective first lens surface parts 240 of those alternating array structures 242 are axisymmetrically adjacent to each other to provide a concave boundary part 242f having a smooth curved surface. In addition, with respect to the second optical axis L2 used as the symmetric axis located between the adjacent alternating array structures 242, the respective second lens surface parts 241 of those alternating array structures 242 are axisymmetrically adjacent to each other to provide a concave boundary part 242e having a smooth curved surface. In this example, all of the concave boundary parts 242e, 242f, and the corners 242c are disposed on a virtual plane 242g orthogonal to the first and second optical axes L1 and L2 together with all of the concave boundary parts 242a. With the above configuration, in the second embodiment, distances D from the virtual plane 242g to the respective light sources 3, in other words, the distances D from the respective concave boundary parts 242f to the light source 3 on the same first optical axis L1 are set to be shorter than a focal length specific to the first virtual lens surfaces 240a. Meanwhile, the distances D may be set to be equal to or longer than the focal length specific to the first virtual lens surfaces 240a.

According to the second embodiment described above, each of the first lens surface parts 240 has a shape obtained by extracting a part from the first virtual lens surface 240a having the concave lens surface shape with a curvature in the reference direction X to be twice differentiable, and the first lens surface parts 240 can exert the light condensing function along the first optical axis L1 on which each light source 3 is disposed. On the other hand, each of the second lens surface parts 241 has a shape obtained by extracting a part from the second virtual lens surface 241a having the concave lens surface shape with a curvature in the reference direction X to be twice differentiable, and the second lens surface parts 241 can exert the light condensing function along the second optical axis L2 eccentric from the first optical axis L1. Moreover, according to the alternating array structures 242 of the first and second lens surface parts 240 and 241 that exert the above particular light condensing functions, the superimposed action of the respective emitted lights passing through the first and second lens surface parts 240 and 241 can be ensured on the second optical axes L2 eccentrically spaced apart from the first optical axes L1 and between those first and second optical axes L1 and L2. Hence, the reliability of the effect of suppressing the illuminance unevenness can be enhanced.

(Third Embodiment)

Figure 8:
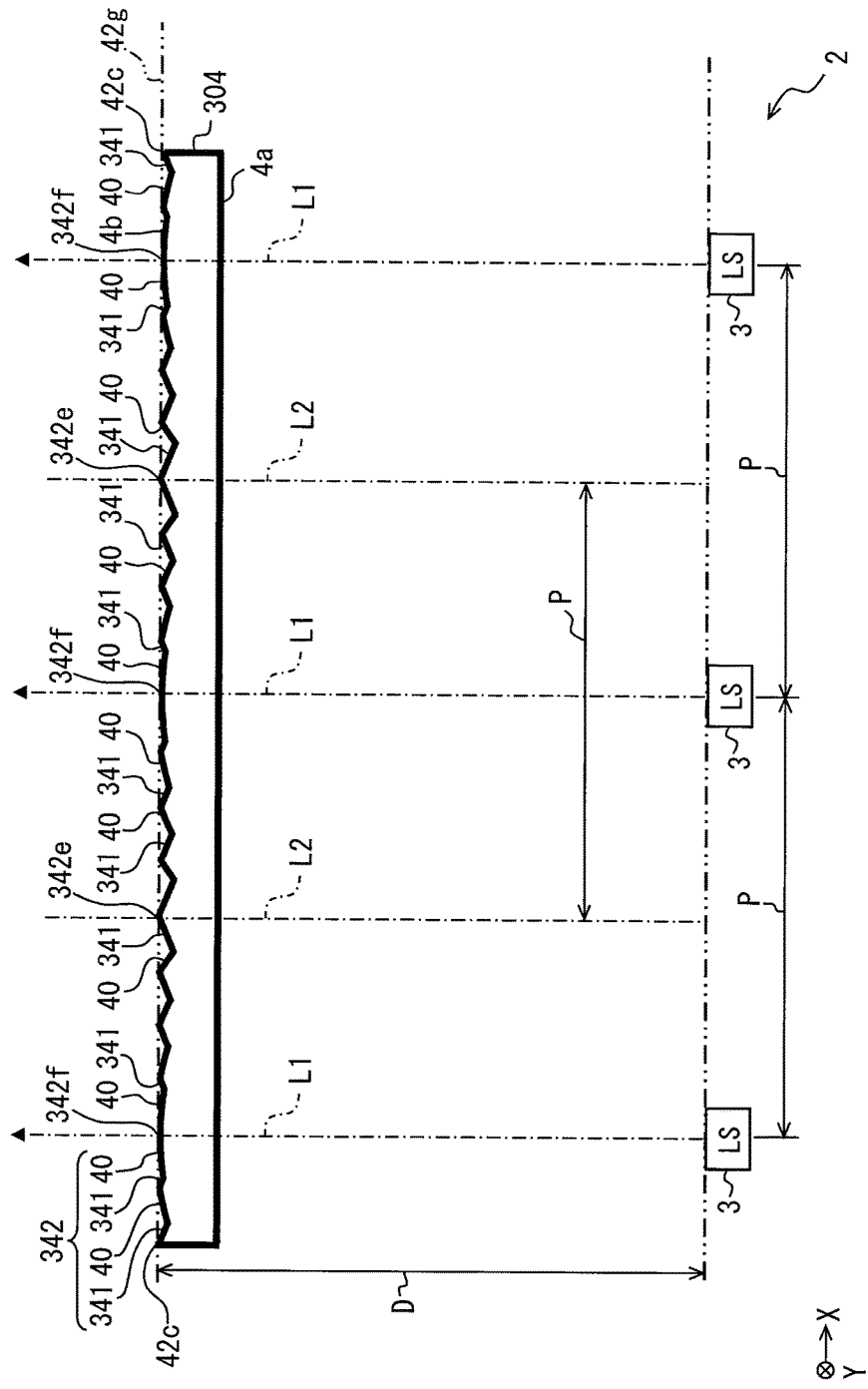
FIG. 8 is a side view illustrating an illumination lens according to a third embodiment of the present disclosure.
Figure 9:
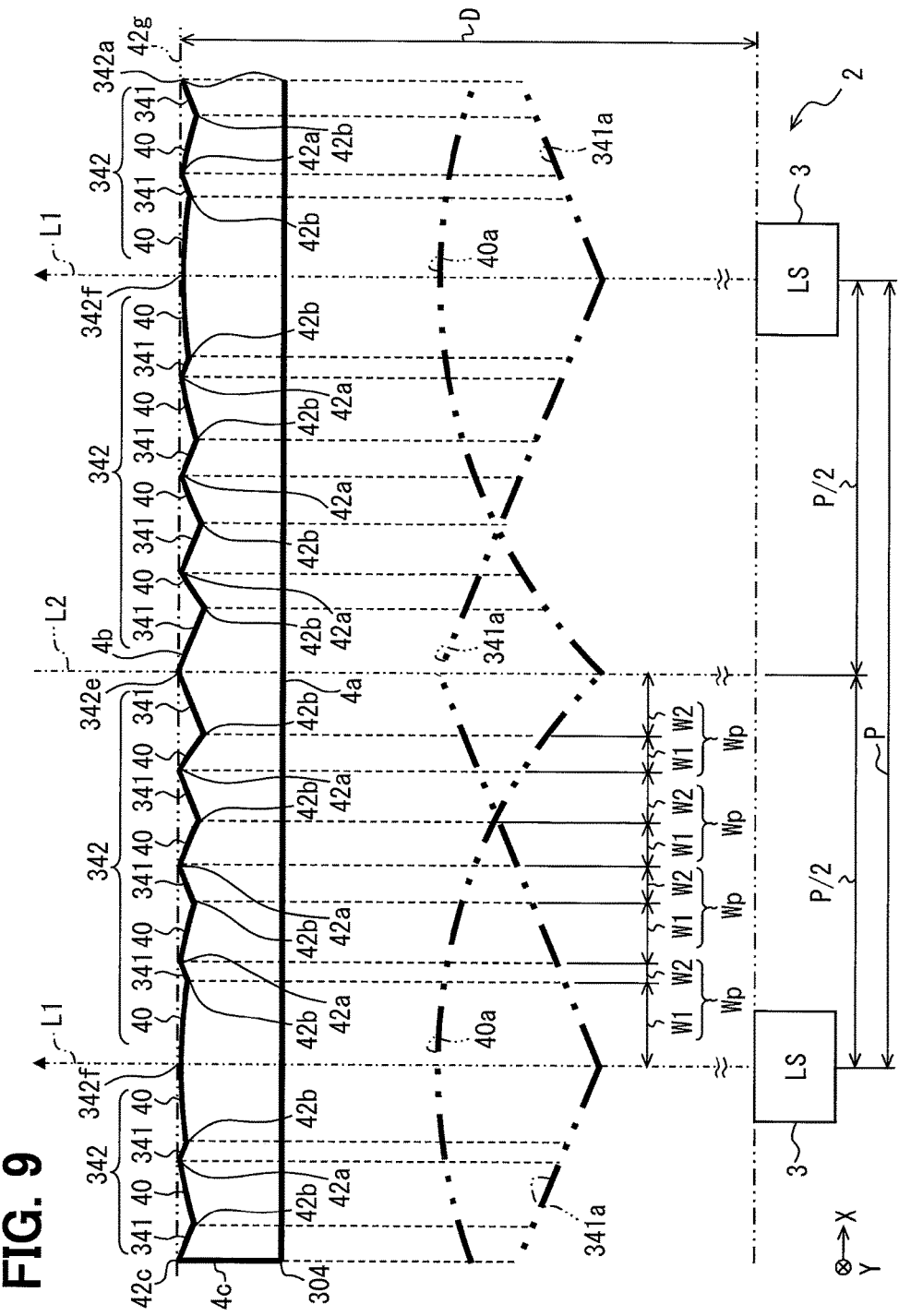
FIG. 9 is a schematic view illustrating the illumination lens according to the third embodiment.

As illustrated in FIGS. 8 and 9, a third embodiment of the present disclosure is a modification of the first embodiment.

Respective second virtual lens surfaces 341a of an illumination lens 304 according to the third embodiment are inclined in a mountain shape relative to a reference direction X so as to be defined to have a prism lens surface shape that is at most once differentiable between optical axes L1 and L2 in a cross-section along the reference direction X. Each of the second virtual lens surfaces 341a has an axisymmetric profile with respect to the corresponding second optical axis L2 as a symmetric axis in the cross-section along the reference direction X. The multiple second virtual lens surfaces 341a have profiles identical with each other, but different from those of the respective first virtual lens surfaces 40a defined as in the first embodiment. A set number of second lens surface parts 341 are extracted from each second virtual lens surface 341a along a second optical axis. In addition, except that the smooth convex boundary parts 42e and 42f are changed into sharp convex boundary parts 342e and 342f, the second virtual lens surfaces 41a and the second lens surface parts 41 according to the first embodiment are replaced with the second virtual lens surfaces 341a and the second lens surface parts 341, respectively.

As described above, the respective second lens surface parts 341 according to the third embodiment have shapes obtained by extracting respective portions from the second virtual lens surface 341a having the prism lens surface shape that is inclined from the reference direction X and is at most once differentiable. Hence, according to alternating array structures 342 of the second lens surface parts 341 thus configured and the first lens surface parts 40, the superimposed action of the respective emitted lights passing through the first and second lens surface parts 40 and 341 can be exerted on each second optical axis L2 eccentrically spaced apart from the first optical axis L1 and between those first and second optical axes L1 and L2. With the same principle as that in the first embodiment, the respective first lens surface parts 40 can exert the light condensing function along the first optical axes L1 on which each light source 3 is disposed. According to the above configuration, the illuminance unevenness can be suppressed while the design and manufacture of the illumination lens 304 are facilitated by allocating a simple shape such as the prism lens surface shape to the respective second lens surface parts 341.

(Fourth Embodiment)

Figure 10:
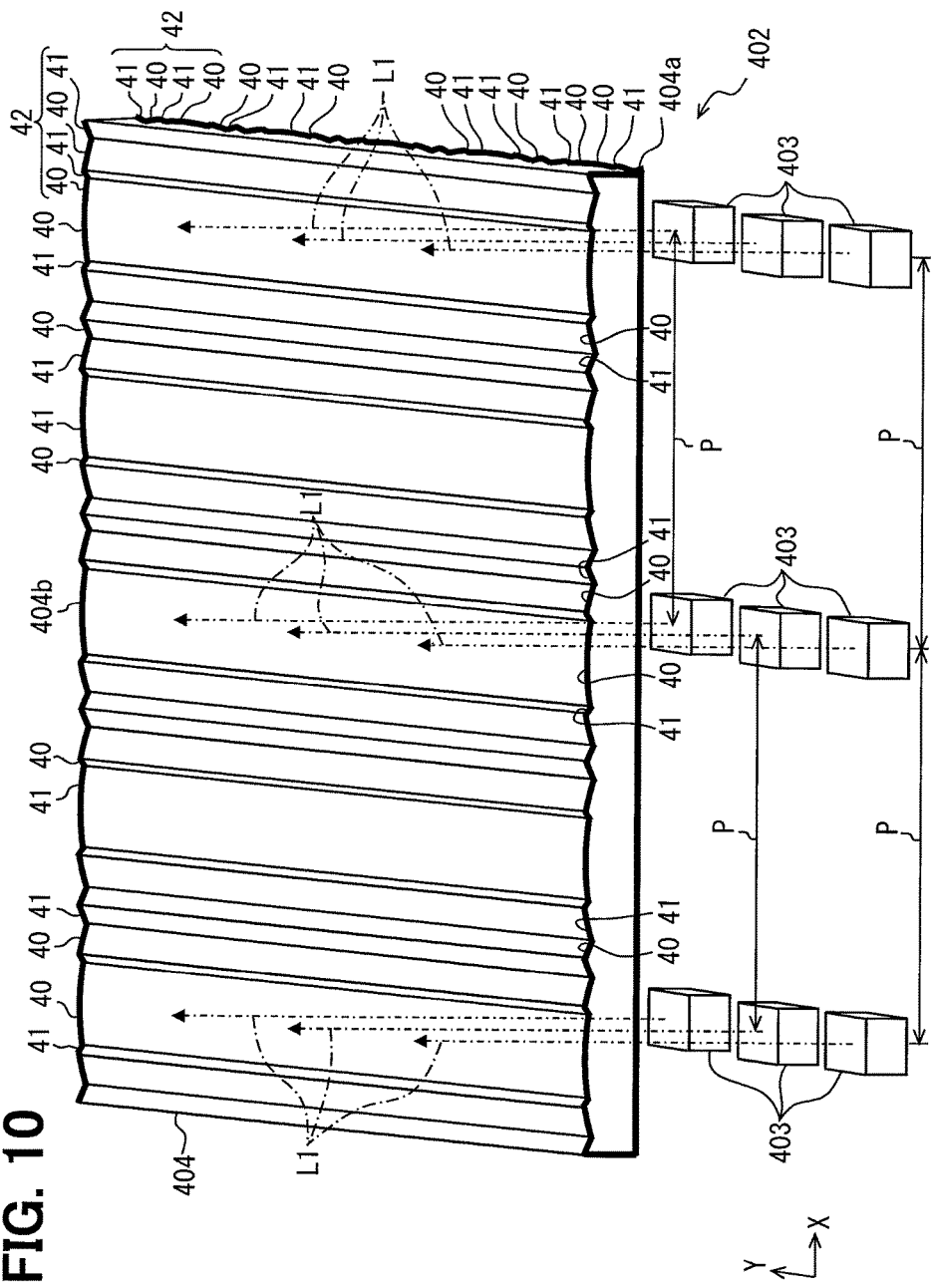
FIG. 10 is a perspective view illustrating an illumination lens according to a fourth embodiment of the present disclosure.
Figure 11:
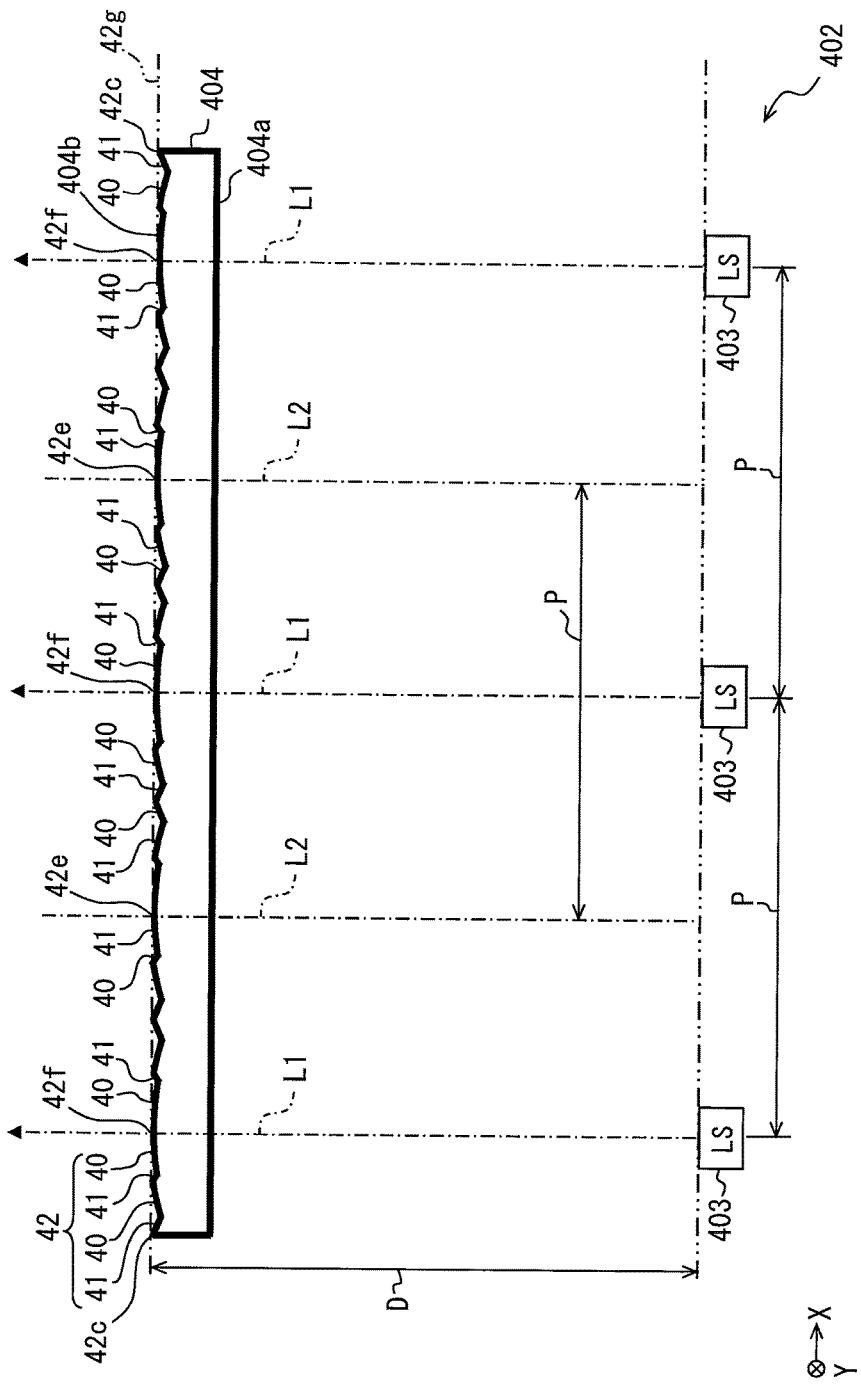
FIG. 11 is a side view illustrating the illumination lens when viewed from an incident surface side reference direction according to the fourth embodiment.
Figure 12:
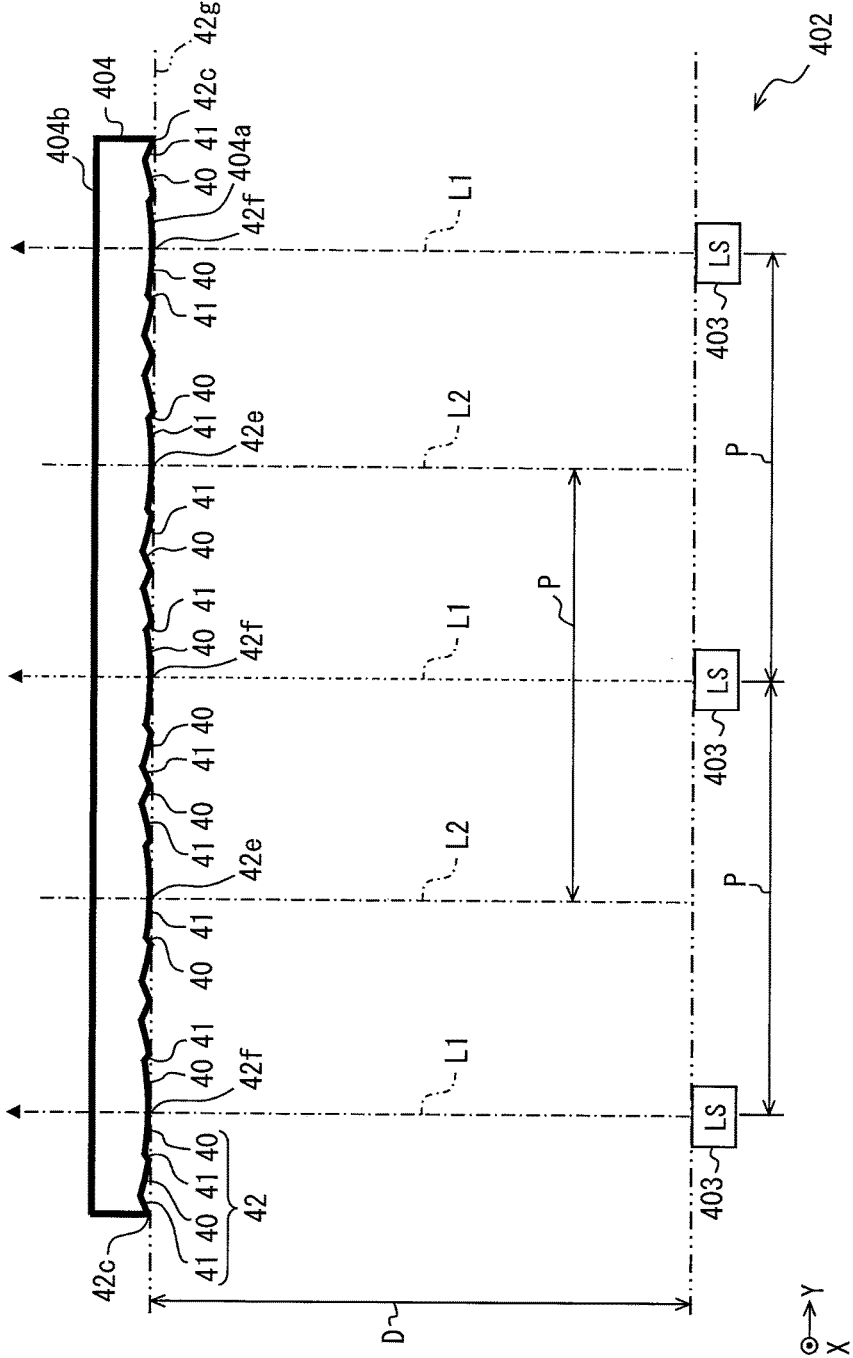
FIG. 12 is a side view illustrating the illumination lens when viewed from an emitting surface side reference direction according to the fourth embodiment.

As illustrated in FIGS. 10 to 12, a fourth embodiment of the present disclosure is a modification of the first embodiment.

In an illumination unit 402 according to the fourth embodiment, in addition to a reference direction X of a longitudinal direction, an orthogonal direction Y of a lateral direction orthogonal to the reference direction X is also set as another reference direction Y. In this example, the reference direction X is an emitting surface side reference direction X along which first and second lens surface parts 40 and 41 forming respective alternating array structures 42 are arranged on an emitting surface 404b of an illumination lens 404 as in the first embodiment. On the other hand, the reference direction Y is an incident surface side reference direction Y along which the first and second lens surface parts 40 and 41 forming the respective alternating array structures 42 according to the first embodiment are arranged on an incident surface 404a of the illumination lens 404.

In the illumination unit 402 described above, as illustrated in FIG. 10, multiple (nine in the present embodiment) light sources 403 (LS) are two-dimensionally arranged in the emitting surface side reference direction X and the incident surface side reference direction Y. In other words, when viewed along the emitting surface side reference direction X, light source columns along each of which a predetermined number (three in the present embodiment) of light sources 403 on first optical axes L1 are aligned are provided in multiple columns (three columns in the present embodiment) in the incident surface side reference direction Y. In other words, when viewed along the incident surface side reference direction Y, light source columns along each of which a predetermined number (three in the present embodiment) of light sources 403 on first optical axes L1 are aligned are provided in multiple columns (three columns in the present embodiment) in the emitting surface side reference direction X.

According to the fourth embodiment described above, as illustrated in FIG. 11, the alternating array structures 42 of the first and second lens surface parts 40 and 41 in the emitting surface side reference direction X are disposed on the emitting surface 404b for emitting incident light from the light sources 403 arranged along the emitting surface side reference direction X in the illumination lens 404. Hence, in the emitting surface side reference direction X, the superimposed action of the respective emitted lights between the first and second optical axes L1 and L2 can be exerted. In addition, as illustrated in FIG. 12, the alternating array structures 42 of the first and second lens surface parts 40 and 41 in the incident surface side reference direction Y are provided on the incident surface 404a that receives the light from the light sources 403 arranged along the incident surface side reference direction Y orthogonal to the emitting surface side reference direction X in the illumination lens 404. Hence, even in the incident surface side reference direction Y, the superimposed action of the respective emitted lights between the first and second optical axes L1 and L2 can be exerted. According to the above configuration, an area of the display 5 in which the illuminance unevenness is suppressed can be enlarged as much as possible, with the use of the light from the multiple light sources 3 that are two-dimensionally arranged in the emitting surface side reference direction X and the incident surface side reference direction Y.

(Other Embodiments)

Although the plurality of embodiments of the present disclosure have been described, the present disclosure should not be construed as being limited to the embodiments and can be applied to various embodiments and combination thereof without departing from the spirit of the disclosure.

Figure 13:
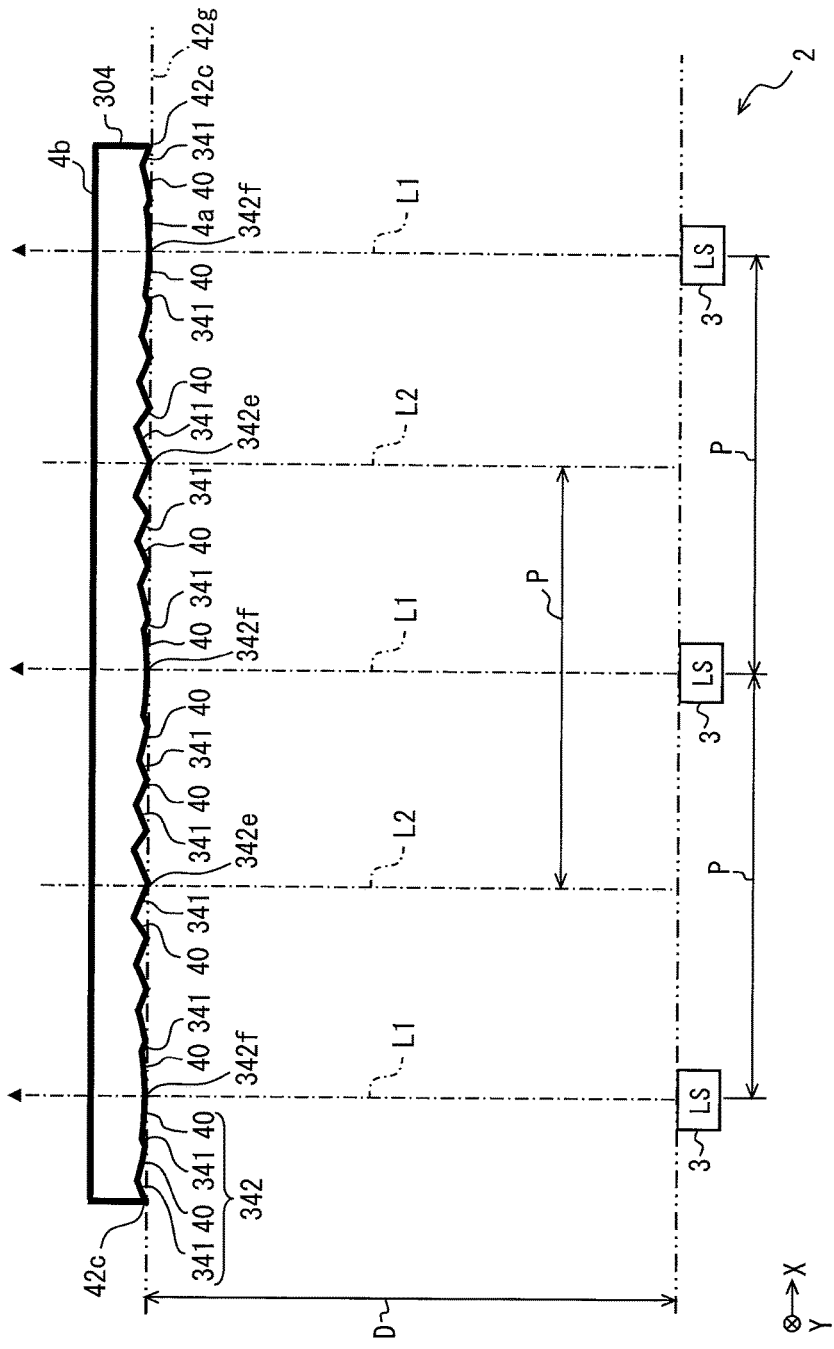
FIG. 13 is a front view illustrating a modification of the illumination lens illustrated in FIG. 8.

Specifically, in a modification 1 of the first to third embodiments, as illustrated in FIG. 13, alternating array structures 42, 242, and 342 may be provided on an incident surface 4a instead of an emitting surface 4b. Meanwhile, FIG. 13 illustrates the modification 1 of the third embodiment.

Figure 14:
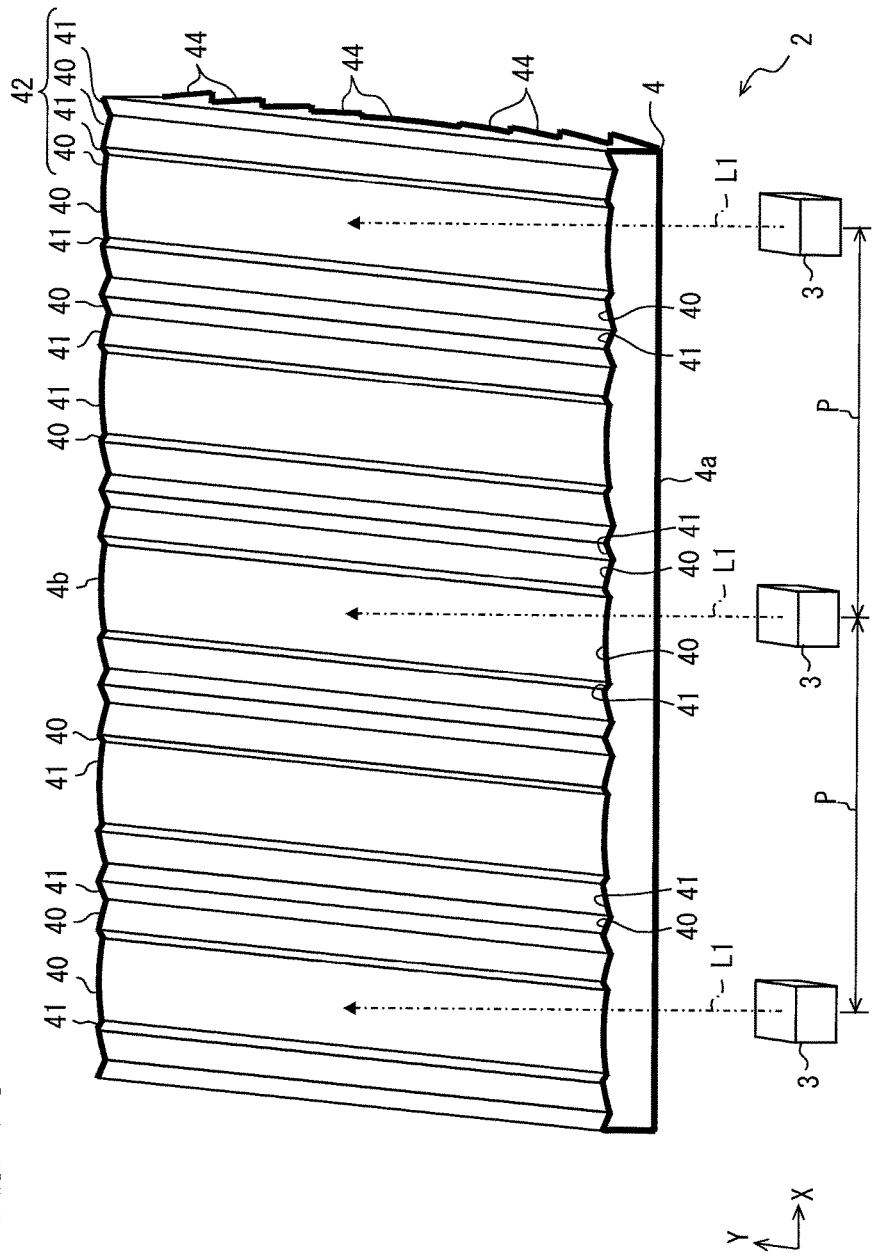
FIG. 14 is a perspective view illustrating a modification of the illumination lens illustrated in FIG. 2.
Figure 15:
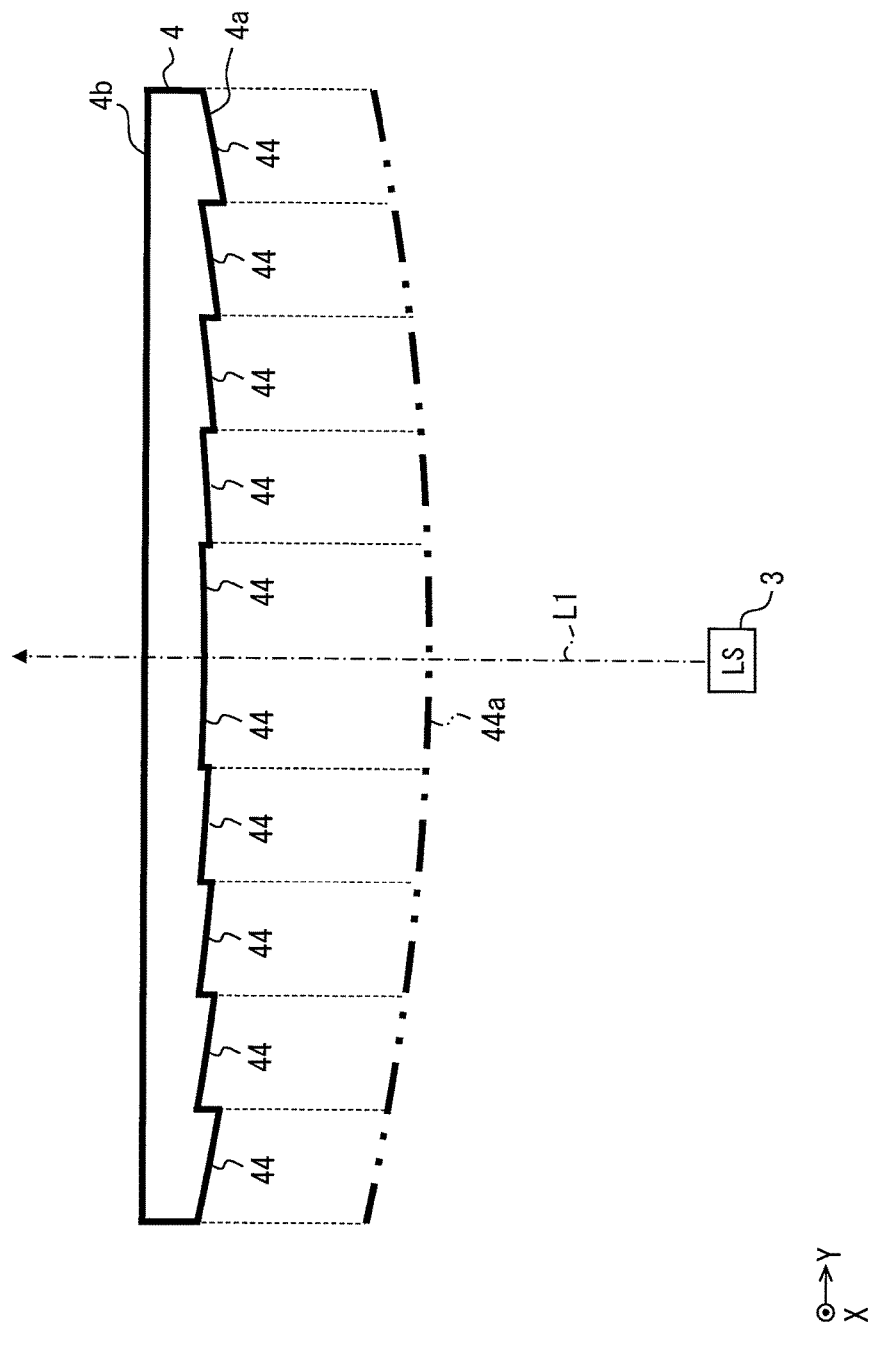
FIG. 15 is a schematic side view illustrating the illumination lens illustrated in FIG. 14.

In a modification 2 of the first to third embodiments and the modification 1, as illustrated in FIGS. 14 and 15, multiple normal Fresnel lens surfaces 44 obtained by divisionally extracting one virtual lens surface 44a in the orthogonal direction Y may be provided on one surface of the emitting surface 4b and the incident surface 4a in which the alternating array structures 42, 242, and 342 are not provided. FIGS. 14 and 15 illustrate the medication 2 of the first embodiment.

Figure 16:
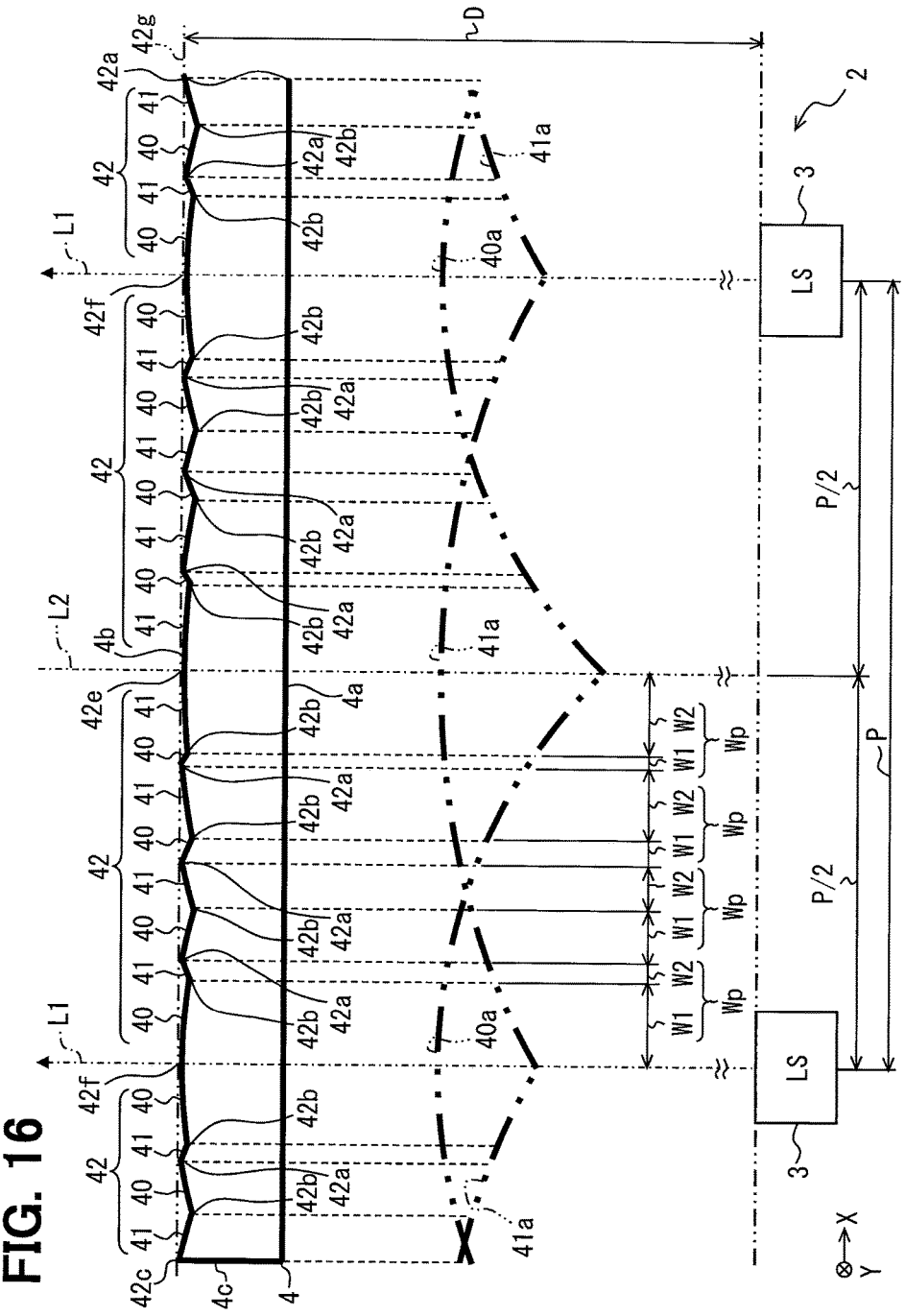
FIG. 16 is a schematic view illustrating a modification of the illumination lens illustrated in FIG. 4.

In a modification 3 of the first, second, and fourth embodiments, as illustrated in FIG. 16, first lens surface parts 40, 240, and second lens surface parts 41, 241 may be extracted from first virtual lens surfaces 40a, 240a, and second virtual lens surfaces 41a, 241a which are different in profile from each other. As the modification 3 of the first embodiment, FIG. 16 illustrates an example in which the second virtual lens surfaces 41a and 241a different in curvature from the first virtual lens surfaces 40a and 240a are defined to make the profiles of the first and second virtual lens surfaces different from each other.

Figure 17:
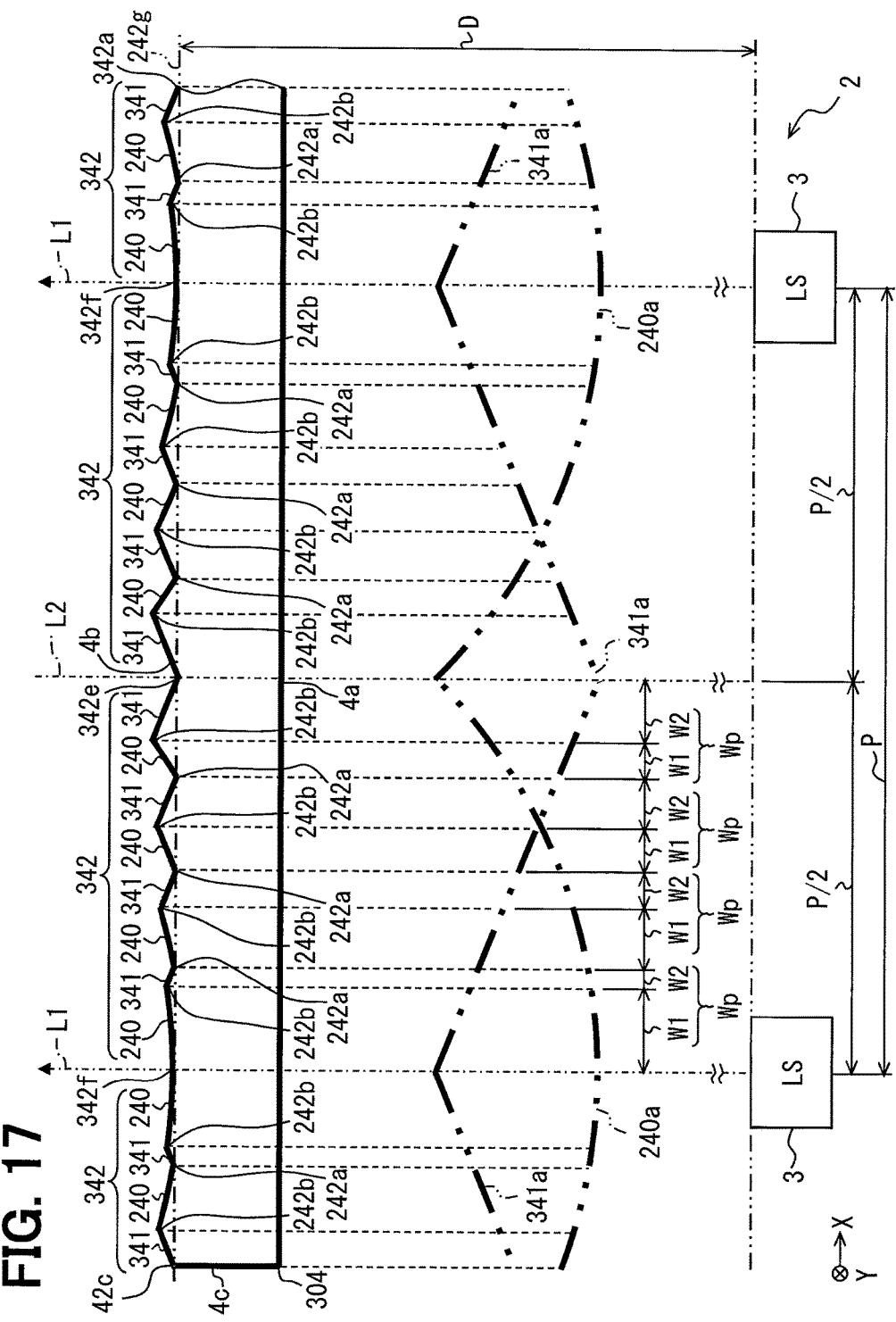
FIG. 17 is a schematic view illustrating a modification of the illumination lens illustrated in FIG. 9.

In a modification 4 of the third embodiment, as illustrated in FIG. 17, first lens surface parts 240 extracted from first virtual lens surfaces 240a of a concave lens surface shape according to the second embodiment may be provided instead of the first lens surface parts 40 extracted from the first virtual lens surfaces 40a of the convex lens surface shape. In the modification 4 of FIG. 17, each of the second virtual lens surfaces 341a has a valley shape, and is inclined relative to a reference direction X and defined into a prism lens surface shape that is at most once differentiable in a cross-section along the reference direction X. In a modification 5 of the fourth embodiment, alternating array structures 242 and 342 according to the second or third embodiment may be provided on both of an emitting surface 404b and an incident surface 404a.

In a modification 6 of the first to fourth embodiments, first lens surface parts 40 and 240 may be extracted from first virtual lens surfaces 40a and 240a of a concave or convex surface shape forming an asymmetric profile between which each first optical axis L1 is sandwiched. In a modification 7 of the first to fourth embodiments, respective first lens surface parts 40 and 240 may be asymmetrically adjacent to each other on each of the first optical axes L1.

In a modification 8 of the first to fourth embodiments, second lens surface parts 41, 241, and 341 may be extracted from second virtual lens surfaces 41a, 241a, and 341a of a convex or concave prism lens surface shape forming an asymmetric profile between which each second optical axis L2 is sandwiched. In a modification 9 of the first to fourth embodiments, the respective second lens surface parts 41, 241, and 341 may be asymmetrically adjacent to each other on each of the second optical axes L2.

In a modification 10 of the first to fourth embodiments, the number of light sources 3 and 403 may be set to one or more other than the number described above. In the case of the modification 10, the number of alternating array structures 42, 242, and 342 may be set to one or more other than the number described above according to the number of light sources 3 and 403.

In a modification 11 of the first to fourth embodiments, the number of paired lens surface parts aligned in a reference direction X in the alternating array structures 42, 242, and 342 may be set to a plural number except for the number described above. In a modification 12 of the first to fourth embodiments, widths Wp of each pair of lens surface parts including the first lens surface parts 40 and the second lens surface parts 41 may be different from each other.

In a modification 13 of the first to fourth embodiments, widths W1 of the respective first lens surface parts 40 and 240 may be set to be narrower as the first lens surface parts 40 and 240 are closer to the first optical axes L1, or may be set to a predetermined width. In a modification 14 of the first to fourth embodiments, widths W2 of the respective second lens surface parts 41, 241, and 341 may be set to be narrower as the second lens surface parts 41, 241, and 341 are closer to each of the second optical axes L2 according to the widths W1 of the first lens surface parts 40 and 240, or may be set to a predetermined width.

In a modification 15 of the first to fourth embodiments, as an example of a "display member" of a vehicle 8, an element other than a windshield 81, for example, a combiner which is attached to an interior side surface of the windshield 81 or which is provided separately from the windshield 81 may be employed.

In a modification 16 of the first to fourth embodiments, the present disclosure may be applied to an HUD device 1 mounted in various moving objects such as ships or airplanes other than the vehicle 8, or illumination units 2, 402, or illumination lens 4, 204, 304, 404 provided in the device 1. Alternatively, in a modification 17 of the first to fourth embodiments, the present disclosure may be applied to illumination units 2, 402, or illumination lens 4, 204, 304, 404 used in devices other than an HUD device 1.

What is claimed is:
1. An illumination lens that condenses a light from a light source and emits the light toward an illumination target to illuminate the target, the illumination lens comprising:
a plurality of first lens surface parts formed into shapes obtained by extracting respective parts from each first virtual lens surface that is a virtual lens surface defining a first optical axis deviated in a reference direction from a second optical axis, the light source being located on the first optical axis, the first virtual lens surface being twice differentiable between the first optical axis and the second optical axis which are arranged in the reference direction; and
a plurality of second lens surface parts formed into shapes obtained by extracting respective parts from each second virtual lens surface that is a virtual lens surface defining the second optical axis, the second virtual lens surface being at least once differentiable, the plurality of second lens surface parts is arranged alternately with the plurality of first lens surface parts in the reference direction, wherein
the plurality of first lens surface parts and the plurality of second lens surface parts are arranged alternately one by one in the reference direction.

2. The illumination lens according to claim 1, wherein
a boundary part between each of the plurality of second lens surface parts and one of the plurality of first lens surface parts which is adjacent to one side of the second lens surface part, and a boundary part between the second lens surface part and another of the plurality of first lens surface parts which is adjacent to an opposite side of the second lens surface part are positionally deviated from each other in the reference direction.

3. The illumination lens according to claim 2, wherein
a width of the plurality of first lens surface parts in the reference direction is gradually increased toward the first optical axis, and
a width of the plurality of second lens surface parts in the reference direction is gradually increased toward the second optical axis.

4. The illumination lens according to claim 1, wherein
one of the plurality of first lens surface parts and one of the plurality of second lens surface parts, which are adjacent to each other, form a pair of lens surface parts,
the pair of lens surface parts is one of plural pairs of lens surface parts, and
each of the plural pairs of lens surface parts has a predetermined width in the reference direction in which the plural pairs of lens surface parts are arranged.

5. The illumination lens according to claim 1, further comprising an emitting surface that emits the light received from the light source, wherein
the plurality of first lens surface parts and the plurality of second lens surface parts are disposed on the emitting surface.

6. The illumination lens according to claim 1, wherein
the light source is one of a plurality of light sources arranged along the reference direction,
the first virtual lens surface is one of a plurality of first virtual lens surfaces that defines a plurality of first optical axes corresponding to the plurality of light sources,
the plurality of first lens surface parts includes a set number of first lens surface parts extracted from each of the plurality of first virtual lens surfaces,
the second virtual lens surface is one of a plurality of second virtual lens surfaces that defines a plurality of second optical axes, the plurality of first optical axes and the plurality of second optical axes being alternately arranged, and
the plurality of second lens surface parts includes a set number of second lens surface parts extracted from each of the plurality of second virtual lens surfaces.

7. The illumination lens according to claim 6, wherein
each of the plurality of second virtual lens surfaces has an axisymmetric profile with respect to a symmetric axis that is a corresponding one of the plurality of second optical axes.

8. The illumination lens according to claim 6, further comprising:
an incident surface on which the light from the light source is incident; and
an emitting surface from which the light incident from the light source emits, wherein
the plurality of first lens surface parts and the plurality of second lens surface parts are arranged along an emitting surface side reference direction on the emitting surface, and
the plurality of first lens surface parts and the plurality of second lens surface parts are arranged on the incident surface along an incident surface side reference direction orthogonal to the emitting surface side reference direction.

9. The illumination lens according to claim 6, wherein
two of the plurality of first lens surface parts are axisymmetrically adjacent to each other with respect to a symmetrical axis that is each of the plurality of first optical axes.

10. The illumination lens according to claim 6, wherein
two of the plurality of second lens surface parts are axisymmetrically adjacent to each other with respect to a symmetrical axis that is each of the plurality of second optical axes.

11. The illumination lens according to claim 1, wherein
the first virtual lens surface is shaped into a convex lens surface having a curvature in the reference direction to be twice differentiable, and
the second virtual lens surface is shaped into a convex lens surface having a curvature in the reference direction to be twice differentiable.

12. The illumination lens according to claim 1, wherein
the first virtual lens surface is shaped into a concave lens surface having a curvature in the reference direction to be twice differentiable, and
the second virtual lens surface is shaped into a concave lens surface having a curvature in the reference direction to be twice differentiable.

13. The illumination lens according to claim 11, wherein
the first virtual lens surface and the second virtual lens surface have the same profile as each other.

14. The illumination lens according to claim 1, wherein
the first virtual lens surface is shaped into a convex lens surface or a concave lens surface, having a curvature in the reference direction to be twice differentiable, and
the second virtual lens surface is shaped into a linear prism lens surface that is inclined relative to the reference direction to be at most once differentiable.

15. An illumination unit comprising:
a light source that emits a light; and
an illumination lens that condenses the light from the light source and emits the light toward an illumination target to illuminate the illumination target, wherein the illumination lens includes:
- a plurality of first lens surface parts formed into shapes obtained by extracting respective parts from each first virtual lens surface that is a virtual lens surface defining a first optical axis, the light source being located on the first optical axis, the first virtual lens surface being twice differentiable; and
- a plurality of second lens surface parts formed into shapes obtained by extracting respective parts from each second virtual lens surface that is a virtual lens surface defining a second optical axis, the second optical axis being deviated in a reference direction from the first optical axis, the second virtual lens surface being at least once differentiable, the plurality of second lens surface parts is arranged alternately with the plurality of first lens surface parts in the reference direction, wherein the plurality of first lens surface parts and the plurality of second lens surface parts are arranged alternately one by one in the reference direction.

16. The illumination unit according to claim 15, wherein
the first virtual lens surface of the illumination lens is shaped into a convex lens surface having a curvature in the reference direction to be twice differentiable, and
the second virtual lens surface of the illumination lens is shaped into a convex lens surface having a curvature in the reference direction to be twice differentiable.

17. The illumination unit according to claim 15, wherein
the first virtual lens surface of the illumination lens is shaped into a concave lens surface having a curvature in the reference direction to be twice differentiable, and
the second virtual lens surface of the illumination lens is shaped into a concave lens surface having a curvature in the reference direction to be twice differentiable.

18. A head-up display device that projects an image onto a display member of a moving object to visibly display a virtual image of the image from an interior of the moving object, the head-up display device comprising:
- a display that displays the image;
- a light source that emits a light; and
- an illumination lens that condenses the light from the light source and emits the light toward the display to illuminate the display, wherein
the illumination lens includes:
- a plurality of first lens surface parts formed into shapes obtained by extracting respective parts from each first virtual lens surface that is a virtual lens surface defining a first optical axis, the light source being located on the first optical axis, the first virtual lens surface being twice differentiable; and
- a plurality of second lens surface parts formed into shapes obtained by extracting respective parts from each second virtual lens surface that is a virtual lens surface defining a second optical axis, the second optical axis being deviated in a reference direction from the first optical axis, the second virtual lens surface being at least once differentiable, the plurality of second lens surface parts is arranged alternately with the plurality of first lens surface parts in the reference direction, wherein the plurality of first lens surface parts and the plurality of second lens surface parts are arranged alternately one by one in the reference direction.

19. The head-up display device according to claim 18, wherein
the first virtual lens surface of the illumination lens is shaped into a convex lens surface having a curvature in the reference direction to be twice differentiable, and
the second virtual lens surface of the illumination lens is shaped into a convex lens surface having a curvature in the reference direction to be twice differentiable.

20. The head-up display device according to claim 18, wherein
the first virtual lens surface of the illumination lens is shaped into a concave lens surface having a curvature in the reference direction to be twice differentiable, and
the second virtual lens surface of the illumination lens is shaped into a concave lens surface having a curvature in the reference direction to be twice differentiable.

* * * * *